United States Patent
You et al.

(10) Patent No.: US 11,930,478 B2
(45) Date of Patent: Mar. 12, 2024

(54) COMMUNICATION METHOD AND RELATED DEVICE

(71) Applicant: HUAWEI TECHNOLOGIES CO., LTD., Shenzhen (CN)

(72) Inventors: Chunhua You, Shanghai (CN); Qiang Fan, Hefei (CN); Wenjie Peng, Shanghai (CN); Jun Wang, Shanghai (CN); Qufang Huang, Shenzhen (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 508 days.

(21) Appl. No.: 17/178,352

(22) Filed: Feb. 18, 2021

(65) Prior Publication Data

US 2021/0176734 A1  Jun. 10, 2021

Related U.S. Application Data

(63) Continuation of application No. PCT/CN2019/100262, filed on Aug. 12, 2019.

(30) Foreign Application Priority Data

Aug. 23, 2018 (CN) .......................... 201810969218.6

(51) Int. Cl.
*H04W 4/00* (2018.01)
*H04W 72/02* (2009.01)
(Continued)

(52) U.S. Cl.
CPC .......... *H04W 72/02* (2013.01); *H04W 72/53* (2023.01); *H04W 72/542* (2023.01);
(Continued)

(58) Field of Classification Search
None
See application file for complete search history.

(56) References Cited

U.S. PATENT DOCUMENTS

2018/0368191 A1* 12/2018 Vutukuri ............... H04W 56/00
2019/0149279 A1*  5/2019 Lee ....................... H04L 1/1887
                                                                      370/329
(Continued)

FOREIGN PATENT DOCUMENTS

CA      3016652 A1    9/2017
CN    106304351 A    1/2017
(Continued)

OTHER PUBLICATIONS

Qualcomm Incorporated. "RRM Requirements for D2D." 3GPP TSG-RAN WG4 #72, R4-145189. Dresden, Germany. Aug. 18-Aug. 22, 2014. 7 pages.
(Continued)

*Primary Examiner* — Bob A Phunkulh
(74) *Attorney, Agent, or Firm* — Maier & Maier, PLLC

(57) ABSTRACT

A communication method for data transmission in the internet of vehicles V2X and a related device. The method includes a first terminal device that receives first information from a first radio access network device, where the first information includes service information of a service of the first terminal device and a resource configuration mode on a sidelink, and there is a correspondence between the service information and the resource configuration mode on the sidelink. The first terminal device transmits, based on the correspondence, data corresponding to the service information on a sidelink transmission resource configured based on the resource configuration mode. The service information may be reliability information.

16 Claims, 6 Drawing Sheets

(51) Int. Cl.
  *H04W 72/53* (2023.01)
  *H04W 72/542* (2023.01)
  *H04W 76/15* (2018.01)
  *H04W 72/25* (2023.01)
  *H04W 72/40* (2023.01)
  *H04W 92/18* (2009.01)

(52) U.S. Cl.
  CPC ............ *H04W 76/15* (2018.02); *H04W 72/25* (2023.01); *H04W 72/40* (2023.01); *H04W 92/18* (2013.01)

(56) References Cited

U.S. PATENT DOCUMENTS

| | | | | |
|---|---|---|---|---|
| 2019/0313279 A1* | 10/2019 | Li | ........................ | H04W 72/12 |
| 2019/0394786 A1* | 12/2019 | Parron | .................. | H04L 5/0032 |
| 2020/0100119 A1* | 3/2020 | Byun | .................... | H04W 76/14 |
| 2020/0120674 A1* | 4/2020 | Lee | .................. | H04W 72/0453 |
| 2020/0128470 A1* | 4/2020 | Mok | ...................... | H04W 76/23 |
| 2020/0367030 A1* | 11/2020 | Baek | .................... | H04W 80/02 |
| 2020/0374859 A1* | 11/2020 | Han | ..................... | H04W 72/02 |
| 2020/0383088 A1* | 12/2020 | Min | .................. | H04W 72/0453 |
| 2020/0389900 A1* | 12/2020 | Lee | ........................ | H04W 72/53 |
| 2020/0396791 A1* | 12/2020 | Kim | ...................... | H04W 76/30 |
| 2021/0144524 A1* | 5/2021 | Byun | .................... | H04B 7/0695 |
| 2021/0168840 A1* | 6/2021 | Han | ..................... | H04W 72/21 |
| 2021/0360721 A1* | 11/2021 | Andersson | ............ | H04W 76/16 |
| 2023/0076122 A1* | 3/2023 | Lee | ..................... | H04W 52/383 |
| 2023/0254101 A1* | 8/2023 | Zhang | ................... | H04L 5/1461 |
| | | | | 370/252 |

FOREIGN PATENT DOCUMENTS

| | | |
|---|---|---|
| CN | 107371182 A | 11/2017 |
| CN | 107592327 A | 1/2018 |
| CN | 108353403 A | 7/2018 |
| EP | 3101978 A1 | 12/2016 |
| WO | 2017012467 A1 | 1/2017 |
| WO | 2018062857 A1 | 4/2018 |

OTHER PUBLICATIONS

Qualcomm Incorporated. "Status Report to TSG" 3GPP TSG RAN Meeting #64, RP-141015. Sophia Antipolis, France. Jun. 10-13, 2014. 25 pages.

* cited by examiner

COMMUNICATION METHOD AND RELATED DEVICE

CROSS-REFERENCE TO RELATED APPLICATIONS

This application is a continuation of International Application No. PCT/CN2019/100262, filed on Aug. 12, 2019, which claims priority to Chinese Patent Application No. 201810969218.6, filed on Aug. 23, 2018. The disclosures of the aforementioned applications are incorporated herein by reference in its entirety.

TECHNICAL FIELD

The embodiments relate to the field of communications technologies, and in particular, to a communication method related to data transmission in the internet of vehicles and a related device.

BACKGROUND

The internet of vehicles (V2X or vehicle to X) is a key technology of the intelligent transportation system, and is considered as one of the most promising fields in the internet of things system with clearest market requirements. V2X features wide application space, great industry potential, and strong social benefits, and is of great significance to promote the innovation and development of the automobile and information communication industry, build new models and new forms of automobile and transportation services, promote the innovation and application of autonomous driving technologies, and improve traffic efficiency and safety. The internet of vehicles generally refers to a communications network providing vehicle information by using a sensor, a vehicle-mounted terminal device, or the like that is loaded on a vehicle, to implement vehicle to vehicle (V2V), vehicle to infrastructure (V2I), vehicle to network (V2N), and vehicle to pedestrian (V2P) communication.

In an internet of vehicles scenario, a vehicle may broadcast information about the vehicle such as a driving speed, a driving direction, a specific location, and abrupt deceleration to a surrounding vehicle through V2V communication, so that a driver of the surrounding vehicle can obtain the information to better learn of a traffic status outside a line of sight, to predict a danger and further avoid the danger.

Generally, in the V2X scenario, a wireless direct communications interface between a terminal device and another terminal device may be referred to as a PC5 interface. Based on the PC5 interface, a communications link for direct communication between the terminal device and the another terminal device may be referred to as a sidelink (SL). The PC5 interface may be a PC5 interface in a communications system of an LTE standard, an NR standard, or the like.

In an existing mechanism, resource configuration modes on a sidelink may generally include a mode 3 and a mode 4. In the mode 3, each time before sending data, a terminal device needs to apply to a network device for a resource, and then sends service data on the resource allocated by the network device. In this case, because resources of terminal devices are uniformly allocated by the network device, a same resource is generally not be allocated to adjacent terminal devices. Therefore, the mode 3 can ensure better transmission reliability. However, each time a terminal device applies for a resource, the terminal device needs to exchange signaling with the network device. Therefore, a transmission delay of sending data in the mode 3 may be longer than that in the mode 4. In the mode 4, when sending data, a terminal device may autonomously obtain a sidelink communication resource from a sidelink transmission resource pool of the terminal device through random selection, a listening-based reservation mechanism, or a part-of-listening-based reservation mechanism, to send the data. In this case, because resources of terminal devices are autonomously selected, signaling may not need to be exchanged between the network device and the terminal devices. Therefore, a transmission delay of sending data in the mode 4 may be shorter than that in the mode 3. However, when different terminals autonomously select resources, the different terminal devices may select a same resource to send data. Consequently, a transmission collision may occur.

Currently, there is no good mechanism to give consideration to both a transmission reliability requirement and a transmission delay requirement of service data, and there is no good mechanism to use, in a proper or balanced way, sidelink transmission resources configured based on the two different resource configuration modes.

SUMMARY

In an existing mechanism, a terminal device usually transmits data on a sidelink transmission resource configured based on a mode 3, or transmits data on a sidelink transmission resource configured based on a mode 4. For example, when the terminal device has the sidelink transmission resource configured based on the mode 3, the terminal device transmits data on the sidelink transmission resource configured based on the mode 3. However, this causes relatively low utilization of the sidelink transmission resource configured based on the mode 4 and increased overheads of a physical downlink control channel (PDCCH). Alternatively, for example, when the terminal device has the sidelink transmission resource configured based on the mode 4, the terminal device transmits data on the sidelink transmission resource configured based on the mode 4. The sidelink transmission resource configured based on the mode 4 is a contention-based resource and has lower reliability than the sidelink transmission resource configured based on the mode 3. Therefore, transmission requirements such as reliability requirements or delay requirements of some services cannot be ensured.

In view of this, embodiments provide a communication method and a related device. According to this method, sidelink transmission resources configured based on two different resource configuration modes may be used in a proper or balanced way, so that transmission of service data having a high reliability requirement is guaranteed, and both a transmission reliability requirement and a transmission delay of the service data are considered.

According to a first aspect, an embodiment provides a communication method, including: the first terminal device receives first information from a first radio access network device, where the first information includes service information of a service of the first terminal device and a resource configuration mode on a sidelink, and there is a correspondence between the service information and the resource configuration mode on the sidelink. The first terminal device transmits, based on the correspondence, data corresponding to the service information on a sidelink transmission resource configured based on the resource configuration mode. The sidelink is a wireless communications link between the first terminal device and a second terminal device.

Optionally, the first information may alternatively include a correspondence between service information of a service of the first terminal device and a resource configuration mode on a sidelink.

In this implementation, resource configuration modes that are on a sidelink and that are corresponding to different service information may be obtained from a network side device. For example, beneficial effects include: different service information corresponding to different service data included in to-be-transmitted data of the terminal device may be transmitted in a balanced way on a sidelink transmission resource configured based on a mode 3 or on a sidelink transmission resource configured based on a mode 4. In addition, transmission of a service that requires high reliability and a low delay is also ensured.

With reference to the first aspect, in a first feasible implementation of the first aspect, that the first terminal device transmits, based on the correspondence, data corresponding to the service information on a sidelink transmission resource configured based on the resource configuration mode may include the following three cases:

In a first case, when the resource configuration mode on the sidelink is a first resource configuration mode, the first terminal device may transmit, based on the correspondence, the data corresponding to the service information on a sidelink transmission resource configured based on the first resource configuration mode.

In a second case, when the resource configuration mode on the sidelink is a second resource configuration mode, the first terminal device may transmit, based on the correspondence, the data corresponding to the service information on a sidelink transmission resource configured based on the second resource configuration mode.

In a third case, when the resource configuration mode on the sidelink is at least one of a first resource configuration mode and a second resource configuration mode, in other words, when the resource configuration mode on the sidelink may be the first resource configuration mode or the second resource configuration mode, the first terminal device may transmit the data corresponding to the service information on a sidelink transmission resource configured based on the at least one of the first resource configuration mode and the second resource configuration mode.

In this implementation, the terminal device transmits data corresponding to different service information in three optional cases. In the first case, service data corresponding to a specific type of service information is transmitted on the sidelink transmission resource configured based on the mode 3. In the second case, service data corresponding to a specific type of service information is transmitted on the sidelink transmission resource configured based on the mode 4. In the third case, service data corresponding to a specific type of service information is transmitted on the sidelink transmission resource configured based on either the mode 3 or the mode 4, which is not limited. For example, beneficial effects include: transmission of some services having a requirement such as high reliability and a low delay on the sidelink transmission resource configured based on the mode 4 can be avoided, or a transmission failure of some services having a requirement such as high reliability and a low delay on the sidelink transmission resource configured based on the mode 3 can be avoided, where the transmission failure is caused by transmission of some services having a requirement such as low reliability and a low delay on the sidelink transmission resource configured based on the mode 3.

With reference to the first feasible implementation of the first aspect, in a feasible implementation, when the resource configuration mode on the sidelink is at least one of the first resource configuration mode and the second resource configuration mode, that the first terminal device transmits, based on the correspondence, the data corresponding to the service information on a sidelink transmission resource configured based on the at least one of the first resource configuration mode and the second resource configuration mode includes the following three cases:

In a first case, when a data buffer size of the data corresponding to the service information is greater than or equal to a threshold, the first terminal device has the sidelink transmission resource configured based on the first resource configuration mode, and the first terminal device transmits the data corresponding to the service information on the sidelink transmission resource configured based on the first resource configuration mode.

In a second case, when a data buffer size of the data corresponding to the service information is greater than or equal to a threshold, the first terminal device has the sidelink transmission resource configured based on the second resource configuration mode, and the first terminal device transmits the data corresponding to the service information on the sidelink transmission resource configured based on the second resource configuration mode.

In a third case, when a data buffer size of the data corresponding to the service information is greater than or equal to a threshold, as long as the first terminal device has the sidelink transmission resource configured based on the first resource configuration mode and/or the sidelink transmission resource configured based on the second resource configuration mode, the first terminal device transmits the data corresponding to the service information on the sidelink transmission resource configured based on the first resource configuration mode and/or on the sidelink transmission resource configured based on the second resource configuration mode. In this implementation, for example, beneficial effects include: compared with transmitting the data corresponding to the service information only on the sidelink transmission resource configured based on the first resource configuration mode or only on the sidelink transmission resource configured based on the second resource configuration mode, when the data buffer size is relatively large, for example, the data buffer size is greater than or equal to the threshold, service data can be transmitted more quickly.

With reference to the first feasible implementation of the first aspect, in a feasible implementation, when the resource configuration mode on the sidelink is at least one of the first resource configuration mode and the second resource configuration mode, that the first terminal device transmits, based on the correspondence, the data corresponding to the service information on a sidelink transmission resource configured based on the at least one of the first resource configuration mode and the second resource configuration mode includes: when the data buffer size of the data corresponding to the service information is less than or equal to the threshold, the first terminal device transmits, based on the correspondence, the data corresponding to the service information on the sidelink transmission resource configured based on the first resource configuration mode or on the sidelink transmission resource configured based on the second resource configuration mode.

With reference to the first aspect, in a feasible implementation, when the data buffer size of the data corresponding to the service information is less than or equal to the threshold, that the first terminal device transmits, based on the correspondence, the data corresponding to the service information on the sidelink transmission resource configured based on the first resource configuration mode or on the sidelink transmission resource configured based on the second resource configuration mode includes: the first terminal device receives second information from the first radio access network device, where the second information includes indication information, and the indication information is used to indicate the first terminal device to transmit, when the data buffer size of the data corresponding to the service information is less than or equal to the threshold, the data corresponding to the service information on the sidelink transmission resource configured based on the first resource configuration mode or on the sidelink transmission resource configured based on the second resource configuration mode. It may be understood that, during specific implementation, the first information and the second information may be same information or information of a same type, the first information and the second information may be carried in a same piece of information or information of a same type, or the first information and the second information may be a same piece of information or information of a same type. This is not limited in the embodiments. In this implementation, for example, beneficial effects include: the network side device may flexibly indicate, according to an actual situation, service data whose data buffer size is less than or equal to a threshold to be transmitted on the sidelink transmission resource configured based on the mode 3 or the mode 4. For example, the network side device may indicate data, having a relatively high reliability requirement in the service data whose data buffer size is less than or equal to the threshold, to be transmitted on the sidelink transmission resource configured based on the mode 3, and may indicate data, having a relatively low reliability requirement in the service data whose data buffer size is less than or equal to the threshold, to be transmitted on the sidelink transmission resource configured based on the mode 4. This ensures that highly reliable data is transmitted on the sidelink transmission resource configured based on the mode 3.

With reference to the first aspect, in a feasible implementation of the first aspect, when the resource configuration mode on the sidelink is at least one of the first resource configuration mode and the second resource configuration mode, that the first terminal device transmits, based on the correspondence, the data corresponding to the service information on a sidelink transmission resource configured based on the at least one of the first resource configuration mode and the second resource configuration mode includes: dividing the data corresponding to the service information into a first part and a second part based on a percentage, where optionally, it may be the first terminal device that divides the data corresponding to the service information into the first part and the second part based on the percentage; and transmitting, by the first terminal device, the first part on the sidelink transmission resource configured based on the first resource configuration mode, and transmitting, by the first terminal device, the second part on the sidelink transmission resource configured based on the second resource configuration mode. In this implementation, based on the percentage, some data may be transmitted on the sidelink transmission resource configured based on the mode 3 or some data may be transmitted on the sidelink transmission resource configured based on the mode 4. For example, beneficial effects include: the terminal device can transmit, in a balanced way, data on the sidelink transmission resource configured based on the mode 3 or on the sidelink transmission resource configured based on the mode 4.

With reference to the first aspect, in a feasible implementation of the first aspect, the method further includes: the first terminal device receives information from the first radio access network device, where the information includes the threshold. Alternatively, the first terminal device stores the threshold, and the first terminal device reads the threshold. In this implementation, for example, beneficial effects include: the threshold may be set by the network side device and sent to the terminal device. The network side device may configure the threshold according to an actual situation. Alternatively, the threshold may be stored in the terminal device in advance and does not need to be obtained via another device. This reduces signaling overheads between devices.

With reference to the first aspect, in a feasible implementation of the first aspect, the method further includes: the first terminal device receives information from the first radio access network device, where the information includes the percentage. Alternatively, the first terminal device stores the percentage, and the first terminal device reads the percentage. In this implementation, for example, beneficial effects include: the percentage may be set by the network side device and sent to the terminal device. The network side device may configure the percentage according to an actual situation. Alternatively, the percentage may be stored in the terminal device in advance and does not need to be obtained via another device. This reduces signaling overheads between devices.

With reference to the first aspect, in a feasible implementation of the first aspect, the first resource configuration mode includes that the first radio access network device configures a sidelink transmission resource, for example, the mode 3, for the first terminal device, and the second resource configuration mode includes that the first terminal device selects a sidelink transmission resource, for example, the mode 4. Alternatively, the first resource configuration mode includes that the first terminal device selects a sidelink transmission resource, and the second resource configuration mode includes that the first radio access network device configures a sidelink transmission resource for the first terminal device. In this implementation, for example, beneficial effects include: the terminal device can use, in a balanced way, sidelink transmission resources configured based on different resource configuration modes.

With reference to the first aspect, in a feasible implementation of the first aspect, the first resource configuration mode includes that the first radio access network device configures a sidelink transmission resource for the first terminal device, and the second resource configuration mode includes that a second radio access network device configures a sidelink transmission resource for the first terminal device. Alternatively, the first resource configuration mode includes that a second radio access network device configures a sidelink transmission resource for the first terminal device, and the second resource configuration mode includes that the first radio access network device configures a sidelink transmission resource for the first terminal device. The first terminal device, the first radio access network device, and the second radio access network device form a dual-connectivity communications architecture. In this implementation, for example, beneficial effects include: the terminal device can use, in a balanced way, sidelink transmission resources configured for the terminal device by a master base station and a secondary base station in the dual-connectivity communications architecture.

With reference to the first aspect, in a feasible implementation of the first aspect, the service information includes any one of the following: a ProSe per packet priority, ProSe per packet reliability, a service identifier, and a quality of service flow identifier. The service identifier may be a destination identifier. The quality of service flow identifier is used to identify a quality of service parameter of the data corresponding to the service information. The quality of service parameter includes any one or more of the following: a resource type, a priority level, a packet delay budget, a packet loss rate, an averaging window, or a maximum data burst volume.

According to a second aspect, an embodiment provides a communication method, including: the first terminal device receives first information from a first radio access network device, where the first information includes service information of a service of the first terminal device and a resource configuration mode on a sidelink, and there is a correspondence between the service information and the resource configuration mode on the sidelink. The first terminal device sends a buffer status report to the first radio access network device based on the correspondence. The sidelink is a wireless communications link between the first terminal device and a second terminal device.

For example, the first information may alternatively include a correspondence between service information of a service of the first terminal device and a resource configuration mode on a sidelink.

With reference to the second aspect, in a feasible implementation of the second aspect, that the first terminal device sends a buffer status report to the first radio access network device based on the correspondence includes: when the resource configuration mode on the sidelink is at least one of a first resource configuration mode and a second resource configuration mode, the first terminal device sends the buffer status report to the first radio access network device based on the correspondence.

In this implementation, when a correspondence between a specific type of service information and a resource configuration mode is that data corresponding to the service information is transmitted on a sidelink transmission resource configured based on either a mode 3 or a mode 4, which is not limited, for the data corresponding to the service information, the terminal device may send, by using a plurality of reporting methods, the buffer status report to the radio access network device to apply to the radio access network device for a sidelink transmission resource. For example, beneficial effects include: overheads of the buffer status report or a size of a resource scheduled by the radio access network device for the terminal device based on the buffer status report can be effectively and properly managed.

With reference to the second aspect, in a feasible implementation of the second aspect, when the resource configuration mode on the sidelink is at least one of the first resource configuration mode and the second resource configuration mode, that the first terminal device sends the buffer status report to the first radio access network device based on the correspondence includes: when a data buffer size of the data corresponding to the service information is greater than or equal to a threshold, and the buffer status report includes the data size of the data corresponding to the service information, the first terminal device sends the buffer status report to the first radio access network device based on the correspondence. In this implementation, for data corresponding to service information whose data buffer size is relatively large, the data size may be directly included in the buffer status report. For example, beneficial effects include: this can simplify calculation of the buffer status report or reduce a delay in resource application and scheduling.

With reference to the second aspect, in a feasible implementation of the second aspect, when the resource configuration mode on the sidelink is at least one of the first resource configuration mode and the second resource configuration mode, that the first terminal device sends the buffer status report to the first radio access network device based on the correspondence includes: dividing the data corresponding to the service information into a first part and a second part based on a percentage, where optionally, it may be the first terminal device that divides the data corresponding to the service information into the first part and the second part based on the percentage; transmitting, by the first terminal device, the first part on the sidelink transmission resource configured based on the first resource configuration mode, and transmitting, by the first terminal device, the second part on the sidelink transmission resource configured based on the second resource configuration mode, where the buffer status report includes a data size of the first part; and sending, by the first terminal device, the buffer status report to the first radio access network device based on the correspondence. In this implementation, data corresponding to a specific type of service information may be divided into two parts based on the percentage. For example, beneficial effects include: this can reduce overheads occupied by the buffer status report sent by the terminal device to the radio access network device, reduce system signaling overheads, or reduce a resource scheduled by the radio access network device for the terminal device based on the buffer status report, to alleviate system resource shortage.

With reference to the second aspect, in a feasible implementation of the second aspect, the method includes: the first terminal device receives information from the first radio access network device, where the information includes the threshold. Alternatively, the first terminal device stores the threshold, and the first terminal device reads the threshold. In this implementation, for example, beneficial effects include: the threshold may be set by the network side device and sent to the terminal device. The network side device may configure the threshold according to an actual situation. Alternatively, the threshold may be stored in the terminal device in advance and does not need to be obtained via another device. This reduces signaling overheads between devices.

With reference to the second aspect, in a feasible implementation of the second aspect, the method includes: the first terminal device receives information from the first radio access network device, where the information includes the percentage. Alternatively, the first terminal device stores the percentage, and the first terminal device reads the percentage. In this implementation, for example, beneficial effects include: the percentage may be set by the network side device and sent to the terminal device. The network side device may configure the percentage according to an actual situation. Alternatively, the percentage may be stored in the terminal device in advance and does not need to be obtained via another device. This reduces signaling overheads between devices.

With reference to the second aspect, in a feasible implementation of the second aspect, the first resource configuration mode includes that the first radio access network device configures a sidelink transmission resource for the first terminal device, and the second resource configuration mode includes that the first terminal device selects a sidelink transmission resource. Alternatively, the first resource configuration mode includes that the first terminal device selects a sidelink transmission resource, and the second resource configuration mode includes that the first radio access network device configures a sidelink transmission resource for the first terminal device. In this implementation, for example, beneficial effects include: the terminal device can use, in a balanced way, sidelink transmission resources configured based on different resource configuration modes.

With reference to the second aspect, in a feasible implementation of the second aspect, the first resource configuration mode includes that the first radio access network device configures a sidelink transmission resource for the first terminal device, and the second resource configuration mode includes that a second radio access network device configures a sidelink transmission resource for the first terminal device. Alternatively, the first resource configuration mode includes that a second radio access network device configures a sidelink transmission resource for the first terminal device, and the second resource configuration mode includes that the first radio access network device configures a sidelink transmission resource for the first terminal device. The first terminal device, the first radio access network device, and the second radio access network device form a dual-connectivity communications architecture. In this implementation, for example, beneficial effects include: the terminal device can use, in a balanced way, sidelink transmission resources configured for the terminal device by a master base station and a secondary base station in the dual-connectivity communications architecture.

With reference to the second aspect, in a feasible implementation of the second aspect, the service information includes any one of the following: a ProSe per packet priority, ProSe per packet reliability, a service identifier, and a quality of service flow identifier. The service identifier is a destination identifier. The quality of service flow identifier is used to identify a quality of service parameter of the data corresponding to the service information. The quality of service parameter includes any one or more of the following: a resource type, a priority level, a packet delay budget, a packet loss rate, an averaging window, or a maximum data burst volume.

According to a third aspect, the embodiments provide a communication method. The method includes: receiving, by the first terminal device from a first radio access network device, information used to indicate the first terminal device to perform repeated transmission, where the information used to indicate the first terminal device to perform repeated transmission includes any one of the following:

indicating the first terminal device to transmit data corresponding to service information that is on a sidelink and repeated data of the data corresponding to the service information that is on the sidelink on a sidelink transmission resource configured based on a first resource configuration mode; or indicating the first terminal device to transmit data corresponding to service information that is on a sidelink and repeated data of the data corresponding to the service information that is on the sidelink on a sidelink transmission resource configured based on a second resource configuration mode; or indicating the first terminal device to transmit data corresponding to service information that is on a sidelink on a sidelink transmission resource configured based on a first resource configuration mode, and to transmit repeated data of the data corresponding to the service information that is on the sidelink on a sidelink transmission resource configured based on a second resource configuration mode; or indicating the first terminal device to transmit repeated data of data corresponding to service information that is on a sidelink on a sidelink transmission resource configured based on a first resource configuration mode, and to transmit the data corresponding to the service information that is on the sidelink on a sidelink transmission resource configured based on a second resource configuration mode. The sidelink is a wireless communications link between the first terminal device and a second terminal device. In this implementation, for example, beneficial effects include: the terminal device can improve, through repeated transmission, reliability of data transmission on a sidelink.

With reference to the third aspect, in a feasible implementation of the third aspect, the method includes: receiving, by the first terminal device from the first radio access network device, information for activating the first terminal device to perform repeated transmission, where the information for activating the first terminal device to perform repeated transmission includes: when the information for indicating to perform repeated transmission includes indicating the first terminal device to transmit the data corresponding to the service information that is on the sidelink and the repeated data of the data corresponding to the service information that is on the sidelink on the sidelink transmission resource configured based on the first resource configuration mode, activating the first terminal device to transmit the repeated data of the data corresponding to the service information that is on the sidelink on the sidelink transmission resource configured based on the first resource configuration mode; or when the information for indicating to perform repeated transmission includes indicating the first terminal device to transmit the data corresponding to the service information that is on the sidelink and the repeated data of the data corresponding to the service information that is on the sidelink on the sidelink transmission resource configured based on the second resource configuration mode, activating the first terminal device to transmit the repeated data of the data corresponding to the service information that is on the sidelink on the sidelink transmission resource configured based on the second resource configuration mode; or when the information for indicating to perform repeated transmission includes indicating the first terminal device to transmit the data corresponding to the service information that is on the sidelink on the sidelink transmission resource configured based on the first resource configuration mode, and to transmit the repeated data of the data corresponding to the service information that is on the sidelink on the sidelink transmission resource configured based on the second resource configuration mode, activating the first terminal device to transmit the repeated data of the data corresponding to the service information that is on the sidelink on the sidelink transmission resource configured based on the second resource configuration mode; or when the information for indicating to perform repeated transmission includes indicating the first terminal device to transmit the repeated data of the data corresponding to the service information that is on the sidelink on the sidelink transmission resource configured based on the first resource configuration mode, and to transmit the data corresponding to the service information that is on the sidelink on the sidelink transmission resource configured based on the second resource configuration mode, activating the first terminal device to transmit the repeated data of the data corresponding to the service information that is on the sidelink on the sidelink transmission resource configured based on the first resource configuration mode; or information for skipping activating or deactivating the first terminal device to transmit the repeated data of the data corresponding to the service information that is on the sidelink. In this implementation, the information for activating the first terminal device to perform repeated transmission may be set by a network side device and sent to the terminal device. The network side device may determine, according to an actual situation, whether repeated transmission needs to be performed to improve reliability of data transmission on a sidelink, or determine which type of repeated transmission is selected to improve reliability of data transmission on a sidelink, thereby improving system flexibility.

With reference to the third aspect, in a feasible implementation of the third aspect, the method includes: when the information for activating the first terminal device to perform repeated transmission includes the information for skipping activating or deactivating the first terminal device to perform repeated transmission, the method further includes: receiving, by the first terminal device, indication information from the radio access network device, where the indication information may include information for indicating the first terminal device to transmit the data corresponding to the service information that is on the sidelink on the sidelink transmission resource configured based on the first resource configuration mode, or information for indicating the first terminal device to transmit the data corresponding to the service information that is on the sidelink on the sidelink transmission resource configured based on the second resource configuration mode. In this implementation, when the information for activating the first terminal device to perform repeated transmission is received, the terminal device can be notified of a specific resource configuration mode in a timely manner, where a sidelink transmission resource on which the data corresponding to the service information can be transmitted is configured based on the specific resource configuration mode.

With reference to the third aspect, in a feasible implementation of the third aspect, the method includes: receiving, by the first terminal device, frequency resource information from the radio access network device, where the frequency resource information includes information about a first frequency resource set and information about a second frequency resource set. In this implementation, the terminal device can obtain information about different frequency resource sets in a timely manner.

With reference to the third aspect, in a feasible implementation of the third aspect, the method includes: the first terminal device receives information that is about a correspondence between the frequency resource information and a resource configuration mode and that is from the radio access network device, where the information includes that information indicating the sidelink transmission resource configured based on the first resource configuration mode may be the first frequency resource set, and that information indicating the sidelink transmission resource configured based on the second resource configuration mode may be the second frequency resource set. In this implementation, the data corresponding to the service information and the repeated data of the data corresponding to the service information can be transmitted on different frequency resource sets. For example, beneficial effects include that reliability of data transmission on a sidelink is improved.

With reference to the third aspect, in a feasible implementation of the third aspect, the method includes: the first resource configuration mode includes that the first radio access network device configures a sidelink transmission resource, for example, the mode 3, for the first terminal device, and the second resource configuration mode includes that the first terminal device selects a sidelink transmission resource, for example, the mode 4. Alternatively, the first resource configuration mode includes that the first terminal device selects a sidelink transmission resource, and the second resource configuration mode includes that the first radio access network device configures a sidelink transmission resource for the first terminal device. In this implementation, for example, beneficial effects include: the terminal device can use, in a balanced way, sidelink transmission resources configured based on different resource configuration modes.

With reference to the third aspect, in a feasible implementation of the third aspect, the method includes: the first resource configuration mode includes that the first radio access network device configures a sidelink transmission resource for the first terminal device, and the second resource configuration mode includes that a second radio access network device configures a sidelink transmission resource for the first terminal device. Alternatively, the first resource configuration mode includes that a second radio access network device configures a sidelink transmission resource for the first terminal device, and the second resource configuration mode includes that the first radio access network device configures a sidelink transmission resource for the first terminal device. The first terminal device, the first radio access network device, and the second radio access network device form a dual-connectivity communications architecture. In this implementation, for example, beneficial effects include: the terminal device can use, in a balanced way, sidelink transmission resources configured for the terminal device by a master base station and a secondary base station in the dual-connectivity communications architecture.

With reference to the third aspect, in a feasible implementation of the third aspect, the service information includes any one of the following: a ProSe per packet priority, ProSe per packet reliability, a service identifier, and a quality of service flow identifier. The service identifier is a destination identifier. The quality of service flow identifier is used to identify a quality of service parameter of the data corresponding to the service information. The quality of service parameter includes any one or more of the following: a resource type, a priority level, a packet delay budget, a packet loss rate, an averaging window, or a maximum data burst volume.

According to a fourth aspect, the embodiments provide a first terminal device. The first terminal device includes at least one corresponding unit configured to perform a method step, an operation, or an action performed by the terminal device in any one of the foregoing aspects and any implementation of the foregoing aspects. The at least one unit may be set to have a one-to-one correspondence with the method step, the operation, or the action performed by the terminal device. These units may be implemented by using a computer program, a hardware circuit, or a computer program in combination with a hardware circuit. For example, the first terminal device may include:

an obtaining module, configured to receive first information from a first radio access network device, where the first information includes service information of a service of the first terminal device and a resource configuration mode on a sidelink, and there is a correspondence between the service information and the resource configuration mode on the sidelink;

a transmission module, configured to transmit data corresponding to the service information on a sidelink transmission resource configured based on the resource configuration mode; and a processing module, configured to enable, based on the correspondence obtained by the obtaining module, the transmission module to transmit the data corresponding to the service information on the sidelink transmission resource configured based on the resource configuration mode, where the sidelink is a wireless communications link between the first terminal device and a second terminal device.

According to a fifth aspect, the embodiments provide a first radio access network device. The first radio access network device includes at least one corresponding unit configured to perform a method step, an operation, or an action performed by the first radio access network device in any one of the foregoing aspects and any implementation of the foregoing aspects. The at least one unit may be set to have a one-to-one correspondence with the method step, the operation, or the action performed by the first radio access network device. These units may be implemented by using a computer program, a hardware circuit, or a computer program in combination with a hardware circuit. For example, the first radio access network device may include:

a sending module, configured to send first information to a first terminal device, where the first information includes service information of a service of the first terminal device and a resource configuration mode on a sidelink, and there is a correspondence between the service information and the resource configuration mode on the sidelink, where the sidelink is a wireless communications link between the first terminal device and a second terminal device.

According to a sixth aspect, the embodiments provide a communications apparatus, where the communications apparatus includes: at least one processor, where the program instruction is executed in the at least one processor, to implement a function of the first terminal device, the first radio access network device, or the second radio access network device in the method according to any one of the first aspect to the third aspect and the implementations of the first aspect to the third aspect. Optionally, the communications apparatus may further include at least one memory, and the memory stores the related program instruction. The communications apparatus may be the first terminal device, the first radio access network device, or the second radio access network device in the method according to any one of the first aspect to the third aspect and the implementation of the first aspect to the third aspect.

According to a seventh aspect, the embodiments provide a system chip, where the system chip may be applied to a communications apparatus, and the system chip includes: at least one processor, where a related program instruction is executed in the at least one processor, to implement a function of the first terminal device, the first radio access network device, or the second radio access network device in the method according to any one of the first aspect to the third aspect and the implementations of the first aspect to the third aspect. Optionally, the system chip may further include at least one memory, and the memory stores the related program instruction.

According to an eighth aspect, the embodiments provide a computer storage medium, where the computer storage medium may be applied to a communications apparatus. The computer-readable storage medium stores a program instruction, and when the related program instruction is run, a function of the first terminal device, the first radio access network device, or the second radio access network device in the method according to any one of the first aspect to the third aspect and the implementations of the first aspect to the third aspect is implemented.

According to a ninth aspect, the embodiments provide a computer program product. The computer program product includes a program instruction, and when a related program instruction is executed, a function of the first terminal device, the first radio access network device, or the second radio access network device in the method according to any one of the first aspect to the third aspect and the implementations of the first aspect to the third aspect is implemented.

According to a tenth aspect, the embodiments provide a communications system. The system includes any one or more of the following: the first terminal device in the fourth aspect, the first radio access network device in the fifth aspect, or the second radio access network device in the fourth aspect or the fifth aspect, the communications apparatus in the sixth aspect, the system chip in the seventh aspect, the computer storage medium in the eighth aspect, or the computer program product in the ninth aspect.

BRIEF DESCRIPTION OF DRAWINGS

The accompanying drawings together with show example embodiments, or features and aspects, and are used to explain principles of the embodiments. It is clear that the accompanying drawings in the following descriptions merely show some embodiments, and a person of ordinary skill in the art can derive other drawings from these accompanying drawings without creative efforts.

DETAILED DESCRIPTION OF EMBODIMENTS

Figure 1:
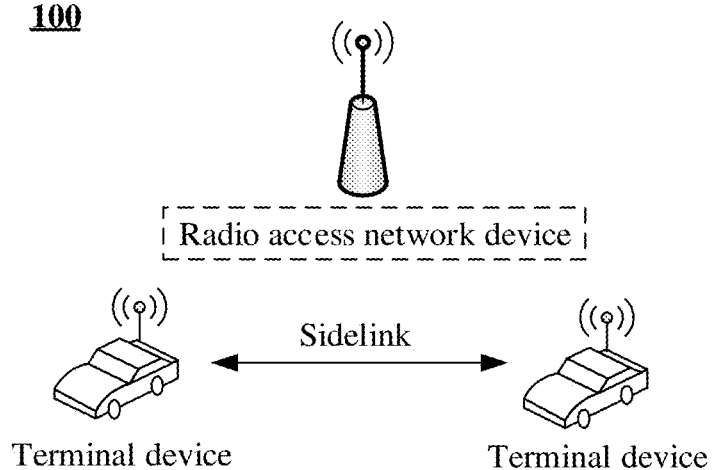
FIG. 1 is a schematic diagram of a network architecture of a possible communications system according to the embodiments.

The following describes solutions in the embodiments with reference to the accompanying drawings.

In the descriptions of the embodiments, terms such as "first" and "second" are merely used for differentiation and description, but should not be understood as an indication or implication of relative importance, or should not be understood as an indication or implication of a sequence. For example, in the embodiments, information such as "first information" and "second information" have different numbers. The numbers are merely used for convenience of context description, and different sequence numbers do not have a specific technical meaning. For example, a first parameter value and a second parameter value may be understood as one or any one of a series of related parameter values. For example, a function of numbered information may be determined based on context content of the numbered information and/or a function of information carried in the numbered information. It may be understood that, during specific implementation, information with different numbers may be same information or information of a same type, information with different numbers may be carried in a same piece of information or information of a same type, or information with different numbers may be a same piece of information or information of a same type. This is not limited in the embodiments.

The term "and/or" describes only an association relationship for describing associated objects and represents that three relationships may exist. For example, A and/or B may represent the following three cases: only A exists, A and B coexist, and only B exists. In addition, the character "/" generally indicates an "or" relationship between the associated objects.

For example, a feature or content marked by a dashed line in the figures in the embodiments is an optional operation or an optional structure in the embodiments.

In the embodiments, the terms "include", "have" and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

The solutions in the embodiments may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a new radio (NR) system in a 5th generation (5G) mobile communications system, and another network system that may be used to provide a mobile communication service. This is not limited herein.

In the embodiments, for example, a related terminal device generally refers to a device having a capability of communicating with a network side device, and may be, for example, user equipment (UE), an access terminal device, a subscriber unit, a subscriber station, a mobile station, a mobile console, a remote station, a remote terminal device, a mobile device, a user terminal device, a terminal device, a wireless terminal device, a user agent, or a user apparatus Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or a vehicle device in the internet of vehicles. A specific implementation form of the terminal device is not limited in the embodiments.

In the embodiments, for example, a radio access network device may be a device configured to communicate with the terminal device. For example, the radio access network device may be a base transceiver station (BTS) in a or a CDMA system, a NodeB (NB) in a wideband code division multiple access (WCDMA) system, an evolved NodeB (eNB or eNodeB) in an LTE system, or a radio controller in a cloud radio access network (CRAN) scenario. Alternatively, the radio access network device may be, for example, a relay station, an access point, a vehicle-mounted device, a wearable device, a radio access network device such as an NR nodeB (gNB or gNodeB) in a future 5G network, a control unit (CU), a distributed unit (DU), or a radio access network device in a future evolved PLMN network. A specific implementation form of the radio access network device is not limited in the embodiments.

For example, the radio access network device may configure the terminal device by using a broadcast signal, radio resource control (RRC) signaling, a media access control control element (MAC CE), downlink control information (DCI), or the like. In the embodiments, information exchanged between radio access network devices may be transferred through an X2 interface or an Xn interface or by using inter-node RRC information in RRC signaling.

For example, a feature or content marked by a dashed line in related figures in the embodiments may be understood as an optional operation or an optional structure in the embodiments.

FIG. 1 is a schematic diagram of a network architecture of a possible communications system according to the embodiments. The solutions in the embodiments are described below with reference to FIG. 1.

For example, the network architecture 100 shown in FIG. 1 may include: a radio access network device and two terminal devices. The two terminal devices may perform wireless direct communication with each other through a sidelink. A process of the wireless direct communication between the terminal devices may be controlled by the radio access network device. For example, two terminal devices are within coverage of the radio access network device, and a process of wireless direct communication between the terminal devices is controlled by the radio access network device. A terminal device used as a data transmit end may send, on a sidelink transmission resource configured by the radio access network device, control information and/or data information to a terminal device used as a data receive end. This mode may be referred to as a centralized scheduling transmission mode or a third mode (mode 3).

Alternatively, a process of the wireless direct communication between the terminal devices may not be controlled by the radio access network device. A terminal device used as a data transmit end may obtain a sidelink transmission resource from a resource pool of the terminal device, to send control information and/or data information to a terminal device used as a data receive end. Alternatively, terminal devices are outside communication coverage of the radio access network device. A terminal device used as a data transmit end autonomously obtains a sidelink communication resource from a pre-configured sidelink transmission resource pool of the terminal device, to send control information and/or data information to a terminal device used as a data receive end. Optionally, a device vendor may store a sidelink transmission resource pool of a terminal device in the terminal device before delivery of the terminal device. Alternatively, when a terminal device accesses a network, the radio access network device configures a sidelink transmission resource pool of the terminal device for the terminal device by using system information broadcast (SIB) information or dedicated radio resource control (dedicated RRC) signaling. This mode may be referred to as a distributed transmission mode or a fourth mode (mode 4).

It should be understood that FIG. 1 is merely an example of a schematic diagram of the network architecture. The network architecture may further include another network element device or function unit. This is not limited.

Figure 2:
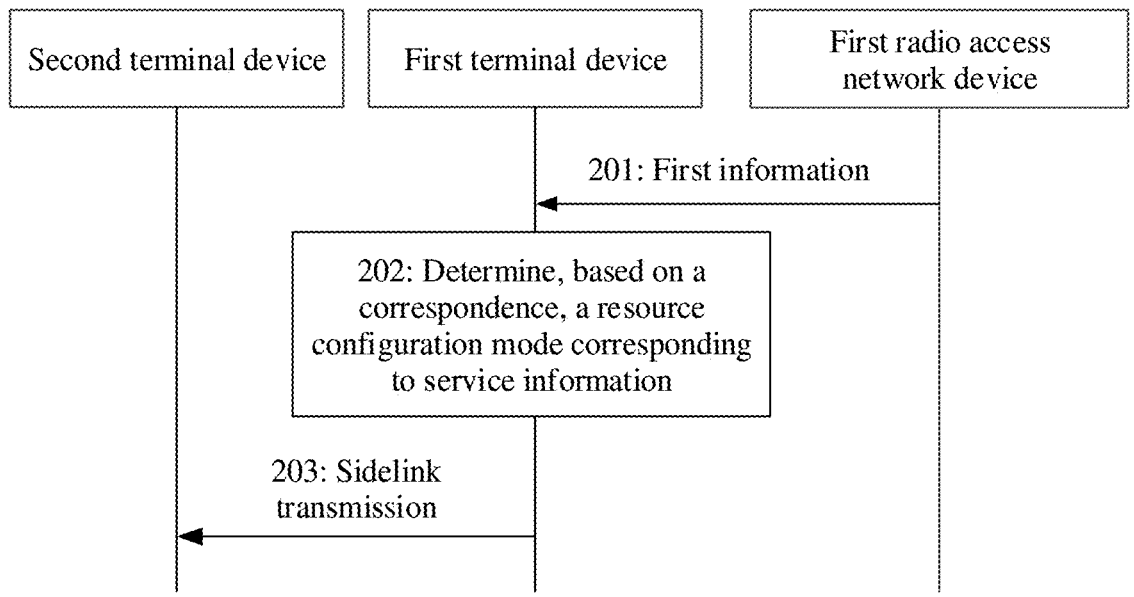
FIG. 2 is a schematic flowchart of a communication method according to the embodiments.

FIG. 2 is a schematic flowchart of a communication method according to the embodiments. The solutions in the embodiments are described below with reference to FIG. 2.

For example, the communication method 200 corresponding to FIG. 2 may include the following steps.

Operation 201: A first radio access network device sends first information to a first terminal device.

For example, the first information may include service information of a service of the first terminal device and a resource configuration mode on a sidelink, and there is a correspondence between the service information and the resource configuration mode on the sidelink.

For example, during specific implementation, alternatively, the first information may directly include a correspondence between service information of a service of the first terminal device and a resource configuration mode on a sidelink.

For example, the first terminal device may transmit, based on the correspondence, data corresponding to the service information on a sidelink transmission resource configured based on the resource configuration mode. For example, the following cases may be included:

In a first case, when the resource configuration mode is a first resource configuration mode, the correspondence may be that the first terminal device may transmit the data corresponding to the service information on a sidelink transmission resource configured based on the first resource configuration mode.

In a second case, when the resource configuration mode is a second resource configuration mode, the correspondence may be that the first terminal device may transmit the data corresponding to the service information on a sidelink transmission resource configured based on the second resource configuration mode.

In a third case, when the resource configuration mode is at least one of a first resource configuration mode and a second resource configuration mode, in other words, when the resource configuration mode on the sidelink may be the first resource configuration mode or the second resource configuration mode, the correspondence may be that the first terminal device may transmit the data corresponding to the service information on a sidelink transmission resource configured based on at least one of the first resource configuration mode and the second resource configuration mode. In other words, the first terminal device may transmit the data corresponding to the service information on the sidelink transmission resource configured based on the first resource configuration mode, or may transmit the data corresponding to the service information on the sidelink transmission resource configured based on the second resource configuration mode.

For example, the first information may include only service information of a service of the first terminal device and the resource configuration mode on the sidelink. There is a correspondence between the service information and the resource configuration mode on the sidelink. Additionally, it may be understood that, alternatively, the first information may include service information of several services of the first terminal device and the resource configuration mode on the sidelink. There is a correspondence between the service information and the resource configuration mode on the sidelink. This is not limited.

For example, the first information may include only a correspondence between service information of a service of the first terminal device and the resource configuration mode on the sidelink. Additionally, it may be understood that, alternatively, the first information may include a correspondence between service information of several services of the first terminal device and the resource configuration mode on the sidelink. This is not limited in the embodiments.

For example, when the service information is ProSe per packet reliability (PPPR), the first resource configuration mode is a mode 3, and the second resource configuration mode is a mode 4, the correspondence between the service information and the resource configuration mode may be shown in Table 1 or Table 2:

TABLE 1

| Service information (PPPR value) | Resource configuration mode | Indicated correspondence |
| --- | --- | --- |
| PPPR1 | Mode 3 | Data corresponding to the PPPR1 may be transmitted on a sidelink transmission resource configured based on the mode 3. |
| PPPR2 | Mode 3 | Data corresponding to the PPPR2 may be transmitted on a sidelink transmission resource configured based on the mode 3. |
| PPPR3 | Mode 3 and/or mode 4 | Data corresponding to the PPPR3 may be transmitted on a sidelink transmission resource configured based on the mode 3, or may be transmitted on a sidelink transmission resource configured based on the mode 4. |
| PPPR4 | Mode 3 and/or mode 4 | Data corresponding to the PPPR4 may be transmitted on a sidelink transmission resource configured based on the mode 3, or may be transmitted on a sidelink transmission resource configured based on the mode 4. |
| PPPR5 | Mode 3 and/or mode 4 | Data corresponding to the PPPR5 may be transmitted on a sidelink transmission resource configured based on the mode 3, or may be transmitted on a sidelink transmission resource configured based on the mode 4. |
| PPPR6 | Mode 3 and/or mode 4 | Data corresponding to the PPPR6 may be transmitted on a sidelink transmission resource configured based on the mode 3, or may be transmitted on a sidelink transmission resource configured based on the mode 4. |
| PPPR7 | Mode 4 | Data corresponding to the PPPR7 may be transmitted on a sidelink transmission resource configured based on the mode 4. |
| PPPR8 | Mode 4 | Data corresponding to the PPPR8 may be transmitted on a sidelink transmission resource configured based on the mode 4. |

TABLE 2

Correspondence between service information and a resource configuration mode
Data corresponding to PPPR1 may be transmitted on a sidelink transmission resource configured based on a mode 3.
Data corresponding to PPPR2 may be transmitted on a sidelink transmission resource configured based on a mode 3.
Data corresponding to PPPR3 may be transmitted on a sidelink transmission resource configured based on a mode 3, or may be transmitted on a sidelink transmission resource configured based on a mode 4.
Data corresponding to PPPR4 may be transmitted on a sidelink transmission resource configured based on a mode 3, or may be transmitted on a sidelink transmission resource configured based on a mode 4.
Data corresponding to PPPR5 may be transmitted on a sidelink transmission resource configured based on a mode 3, or may be transmitted on a sidelink transmission resource configured based on a mode 4.
Data corresponding to PPPR6 may be transmitted on a sidelink transmission resource configured based on a mode 3, or may be transmitted on a sidelink transmission resource configured based on a mode 4.
Data corresponding to PPPR7 may be transmitted on a sidelink transmission resource configured based on a mode 4.
Data corresponding to PPPR8 may be transmitted on a sidelink transmission resource configured based on a mode 4.

It should be noted that Table 1 or Table 2 shows only a possible correspondence between the data corresponding to the service information and the resource configuration mode. The correspondence is not limited to a form shown in Table 1 or Table 2. This is not limited in the embodiments. For example, when both the radio access network device and the terminal device store content in Table 1 or Table 2, the first information may indicate the correspondence in a form of a bit string or a bitmap. For example, "000" is used to indicate the first row in Table 1 or Table 2, . . . , and "111" is used to indicate the eighth row in Table 1 or Table 2. In this implementation, for example, beneficial effects include: content included in the first information can be flexibly configured or signaling overheads can be flexibly controlled.

For example, the service information of the service of the terminal device may include at least one of the following: a service identifier, PPPR, a ProSe per packet priority (PPPP), and a quality of service flow identifier (QFI). The service identifier is used to uniquely identify a service. For example, the service identifier may be a destination identifier. The PPPR and the PPPP are quantification parameters of quality of service (QoS) of a service. The QFI is used to identify a quality of service flow (QoS flow), and the QoS flow is a fine-grained QoS differentiation mechanism. One QoS flow may have a same QoS parameter. The QoS parameter may include any one or more of the following parameters: a resource type, a priority level, a packet delay budget (PDB), a packet error rate (PER), an averaging window, and a maximum data burst volume (MDBV) The resource type may include a guaranteed bit rate (GBR), a non-guaranteed bit rate (non-GBR), and a delay critical GBR, where the GBR is used to indicate a guaranteed transmission resource for a QoS flow. The resource type is used to determine whether a value of a dedicated guaranteed flow bit rate (guaranteed bit rate, GFBR) related to a network resource is permanently allocated. The priority level is used to indicate scheduling priorities of different QoS flows. A high-priority QoS flow should be preferentially scheduled. A priority level associated with a 5G QoS feature may be used to indicate a resource scheduling priority in a QoS flow. The PDB is used to indicate an upper limit of a time period during which a data packet may be delayed between user equipment (UE) and a packet data network-gateway (P-GW). The PER defines an upper limit of a packet loss ratio of a protocol data unit (PDU) (for example, an IP data packet), and the PDU may be a data packet that has been sent but has not been successfully received and processed. The averaging window is defined only for a GBR QoS flow, and the averaging window indicates duration in which a GFBR and a maximum flow bit rate (MFBR) are to be calculated. The MDBV is used only for a delay critical GBR resource type, and the MDBV indicates a maximum amount of data that needs to be served by a 5G access network (5G-AN) in a 5G-AN PDB (that is, a 5G-AN partial PDB).

The first resource configuration mode may be the mode 3, and the second resource configuration mode may be the mode 4. In this implementation, for example, beneficial effects include: the terminal device can use, in a balanced way, sidelink transmission resources configured based on different resource configuration modes.

Optionally, the first resource configuration mode and the second resource configuration mode may alternatively be resource configuration modes in different standards. For example, the first resource configuration mode may be a mode 3 in an LTE standard, and the second resource configuration mode may be a mode 3 in an NR standard. For example, the first resource configuration mode may be a mode 3 in an LTE standard, and the second resource configuration mode may be a mode 4 in an NR standard. A system of first standard and a system of second standard are communication systems of two different standards, and a difference between the first standard and the second standard may include at least a waveform parameter, a modulation scheme, a bandwidth configuration, a radio frame configuration mode, a resource multiplexing mode, and a coding scheme. For example, the system of the first standard may be an LTE mobile communications system, and a system of the second standard may be a 5G mobile communications system or an NR system. The mode 3 in the LTE standard and the mode 3 in the NR standard may be resource configuration modes belonging to a same radio access network device. The radio access network device may be an LTE eNB base station or may be an NR gNB base station. On one hand, the terminal device may distinguish whether a resource allocated by the radio access network device is an LTE resource or an NR resource in two manners. In one manner, the terminal device distinguishes whether the resource allocated by the radio access network device is an LTE resource or an NR resource, based on different radio network temporary identifiers (RNTI) corresponding to DCI of the LTE resource and the NR resource allocated by the radio access network device. In another manner, when the radio access network device allocates an LTE resource and an NR resource to the terminal, the LTE resource and the NR resource share a DCI format, and a reserved bit in DCI is used to indicate whether a resource allocated to the terminal device is an LTE resource or an NR resource. On the other hand, the radio access network device may distinguish between terminal devices by using a cyclic redundancy check (CRC) bit of DCI scrambled by using an RNTI, and only a terminal device that has the corresponding RNTI can accurately receive the DCI. In this implementation, for example, beneficial effects include: the terminal device can use, in a balanced way, sidelink transmission resources configured based on resource configuration modes in different standards.

Optionally, the first resource configuration mode and the second resource configuration mode may alternatively be resource configuration modes configured by different radio access network devices. For example, the first resource configuration mode may be a mode 3 of the first radio access network device, and the second resource configuration mode may be a mode 3 of a second radio access network device. For example, the first terminal device, the first radio access network device, and the second radio access network device may form a dual-connectivity communications architecture. For example, in the dual-connectivity communications architecture, a terminal device may have communication connections to two radio access network devices at the same time and can receive and send data. One of the two radio access network devices may be responsible for exchanging radio resource control information with the terminal device, and responsible for interacting with a core network control plane entity. In this case, the radio access network device may be referred to as a master node, and the other radio access network device may be referred to as a secondary node. For example, the first radio access network device may be a master node in the dual-connectivity communications architecture, and the second radio access network device may be a secondary node in the dual-connectivity communications architecture. Alternatively, the first radio access network device may be a secondary node in dual-connectivity, and the second radio access network device may be a master node in dual-connectivity. In this implementation, for example, beneficial effects include: the terminal device can use, in a balanced way, sidelink transmission resources configured by different radio access network devices for the terminal device.

Operation 202: The first terminal device determines, based on the correspondence, the resource configuration mode corresponding to the service information.

For example, the first terminal device determines, based on the correspondence obtained from the first information in operation 201, the resource configuration mode corresponding to the service information. The determining the resource configuration mode corresponding to the service information may include any one of the following cases:

In a first case, the first terminal device may transmit the data corresponding to the service information on the sidelink transmission resource configured based on the first resource configuration mode.

In a second case, the first terminal device may transmit the data corresponding to the service information on the sidelink transmission resource configured based on the second resource configuration mode.

In a third case, the first terminal device may transmit the data corresponding to the service information on the sidelink transmission resource configured based on at least one of the first resource configuration mode and the second resource configuration mode. In other words, the first terminal device may transmit the data corresponding to the service information not only on the sidelink transmission resource configured based on the first resource configuration mode but also on the sidelink transmission resource configured based on the second resource configuration mode.

Operation 203: The first terminal device transmits the data corresponding to the service information on the sidelink transmission resource.

For example, that the first terminal device transmits the data corresponding to the service information on the sidelink based on the resource configuration mode determined in operation 202 may include any one of the following cases:

In a first case, the first terminal device transmits the data corresponding to the service information on the sidelink transmission resource configured based on the first resource configuration mode.

In a second case, the first terminal device transmits the data corresponding to the service information on the sidelink transmission resource configured based on the second resource configuration mode.

In a third case, the first terminal device transmits the data corresponding to the service information on the sidelink transmission resources configured based on the first resource configuration mode and the second resource configuration mode.

The sidelink transmission resource configured by the radio access network device for the first terminal device based on the resource configuration mode may include any one or more of the following: an air interface parameter resource, a subcarrier spacing, physical sidelink shared channel (PSSCH) duration, a modulation and coding scheme table, and the like. The sidelink transmission resource configured by the radio access network device for the first terminal device based on the first resource configuration mode and the sidelink transmission resource configured by the radio access network device for the first terminal device based on the second resource configuration mode may be located on a same component carrier, or may be located on different component carriers. For example, when the sidelink transmission resources of the two resource configuration modes are located on a same component carrier, or when the sidelink transmission resource configured by the radio access network device for the first terminal device based on the first resource configuration mode and the sidelink transmission resource configured by the radio access network device for the first terminal device based on the second resource configuration mode overlap in terms of time or frequency, the radio access network device may indicate whether the first terminal device can transmit data by simultaneously using sidelink transmission resources configured based on different resource configuration modes.

In this implementation, for example, beneficial effects include: different service information corresponding to different service data included in to-be-transmitted data of the terminal device may be transmitted in a balanced way on the sidelink transmission resource configured based on the mode 3 or on the sidelink transmission resource configured based on the mode 4. In addition, transmission of some services having a requirement such as high reliability and a low delay on the sidelink transmission resource configured based on the mode 4 can be avoided, or a transmission failure of some services having a requirement such as high reliability and a low delay on the sidelink transmission resource configured based on the mode 3 can be avoided, where the transmission failure is caused by transmission of some services having a requirement such as low reliability and a low delay on the sidelink transmission resource configured based on the mode 3. Transmission of service data having a high reliability requirement is guaranteed, and both a transmission reliability requirement and a transmission delay of the service data are considered.

Figure 3:
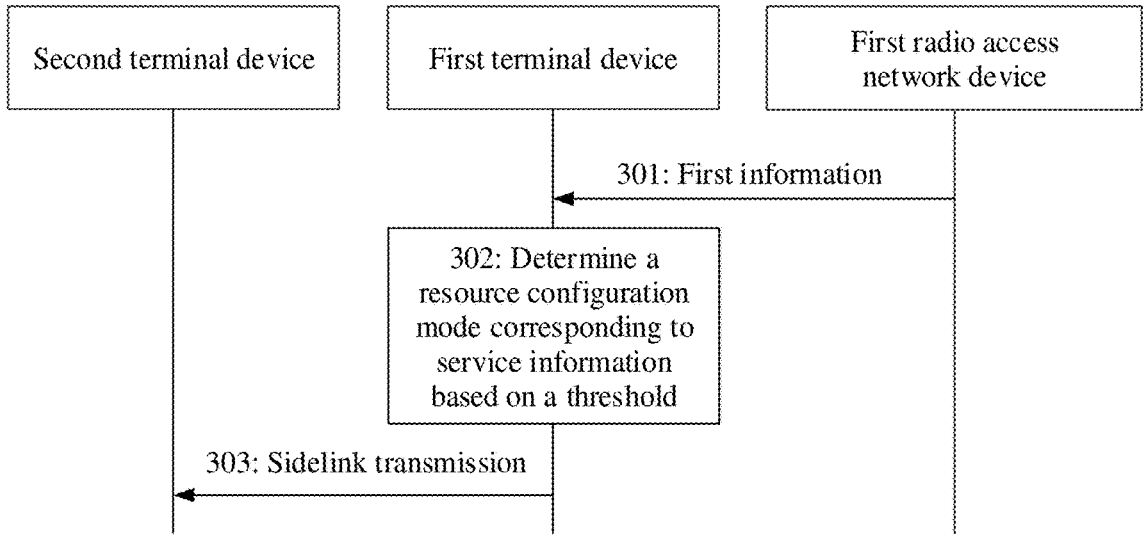
FIG. 3 is a schematic flowchart of a communication method according to the embodiments.

FIG. 3 is a schematic flowchart of a communication method according to the embodiments. The solutions in the embodiments are described below with reference to FIG. 3. For example, the communication method 300 corresponding to FIG. 3 may include the following steps.

Operation 301: For this operation, refer to operation 201, and an optional operation of operation 201 may be included. Details are not described herein again.

Operation 302: The first terminal device determines, based on a threshold, the resource configuration mode corresponding to the service information.

For example, in the third case in operation 301, that is, when the first terminal device may transmit the data corresponding to the service information on the sidelink transmission resource configured based on the first resource configuration mode, or may transmit the data corresponding to the service information on the sidelink transmission resource configured based on the second resource configuration mode, the first terminal device may determine, based on the threshold, the resource configuration mode corresponding to the service information. For example, the following cases may be included:

When a data buffer size of the data corresponding to the service information is greater than or equal to the threshold, and the first terminal device has the sidelink transmission resource configured based on the first resource configuration mode, the first terminal device may transmit the data corresponding to the service information on the sidelink transmission resource configured based on the first resource configuration mode.

When a data buffer size of the data corresponding to the service information is greater than or equal to the threshold, and the first terminal device has the sidelink transmission resource configured based on the second resource configuration mode, the first terminal device may transmit the data corresponding to the service information on the sidelink transmission resource configured based on the second resource configuration mode.

When a data buffer size of the data corresponding to the service information is greater than or equal to the threshold, and the first terminal device has the sidelink transmission resource configured based on the first resource configuration mode and the sidelink transmission resource configured based on the second resource configuration mode, the first terminal device may transmit the data corresponding to the service information on the sidelink transmission resource configured based on the first resource configuration mode and on the sidelink transmission resource configured based on the second resource configuration mode.

In this implementation, for example, beneficial effects include: compared with transmitting the data corresponding to the service information only on the sidelink transmission resource configured based on the first resource configuration mode or only on the sidelink transmission resource configured based on the second resource configuration mode, when the data buffer size is relatively large, for example, the data buffer size is greater than or equal to the threshold, service data can be transmitted more quickly.

When the data buffer size of the data corresponding to the service information is less than or equal to the threshold, the first radio access network device may send second information to the first terminal device. The second information may include indication information, and the indication information is used to indicate the first terminal device to transmit the data corresponding to the service information on the sidelink transmission resource configured based on the first resource configuration mode.

When the data buffer size of the data corresponding to the service information is less than or equal to the threshold, the first radio access network device may send second information to the first terminal device. The second information may include indication information, and the indication information is used to indicate the first terminal device to transmit the data corresponding to the service information on the sidelink transmission resource configured based on the second resource configuration mode.

In this implementation, for example, beneficial effects include: a network side device may flexibly indicate, according to an actual situation, that service data whose data buffer size is less than or equal to a threshold is to be transmitted on the sidelink transmission resource configured based on the mode 3 or the mode 4. For example, the network side device may indicate data, having a relatively high reliability requirement in the service data whose data buffer size is less than or equal to the threshold, to be transmitted on the sidelink transmission resource configured based on the mode 3, and may indicate data, having a relatively low reliability requirement in the service data whose data buffer size is less than or equal to the threshold, to be transmitted on the sidelink transmission resource configured based on the mode 4. This ensures that highly reliable data is transmitted on the sidelink transmission resource configured based on the mode 3.

For example, when calculating a data buffer size of one piece of service information, the terminal device needs to consider data buffer sizes in a plurality of PDCP entities and/or radio link control (RLC) entities corresponding to the service information. For example, these PDCP entities and RLC entities may correspond to different media access control (MAC) entities. In the embodiments, one piece of service information may correspond to a plurality of packet data convergence protocol (PDCP) entities and/or RLC entities. For example, one PPPP corresponds to two logical channels (LCH), that is, corresponds to a plurality of PDCP entities and/or RLC entities.

It may be understood that, during specific implementation, the first information and the second information may be same information or information of a same type, the first information and the second information may be carried in a same piece of information or information of a same type, or the first information and the second information may be a same piece of information or information of a same type. This is not limited.

Optionally, a device vendor may store content of the second information in the first terminal device before delivery of the first terminal device, or a network device may pre-configure content of the second information in the first terminal device when the first terminal device is able to connect to a network. For example, the first terminal device stores the content of the second information in a memory, and the first terminal device can read the content of the second information from the memory. In this implementation, for example, beneficial effects include: the content of the second information may be stored in the terminal device in advance, and does not need to be obtained via another device. This reduces signaling overheads between devices.

Optionally, the first radio access network device sends information to the first terminal device, where the information may include the threshold. Optionally, the device vendor may store the threshold in the first terminal device before delivery of the first terminal device, or the network device may pre-configure the threshold in the first terminal device when the first terminal device is able to connect to a network. For example, the first terminal device stores the threshold in the memory, and the first terminal device can read the threshold from the memory. In this implementation, for example, beneficial effects include: the threshold may be set by the network side device and sent to the terminal device. The network side device may configure the threshold according to an actual situation. Alternatively, the threshold may be stored in the terminal device in advance and does not need to be obtained via another device. This reduces signaling overheads between devices.

Operation 303: For this operation, refer to operation 203, and an optional part of operation 203 may be included. Details are not described herein again.

For example, in FIG. 3, the first terminal device or a second terminal device may be a vehicle device, and the first radio access network device or a second radio access network device may be an eNB base station in an LTE standard, a gNB base station in an NR standard, a master node in a dual-connectivity communications architecture, or a secondary node in a dual-connectivity communications architecture.

Figure 4:
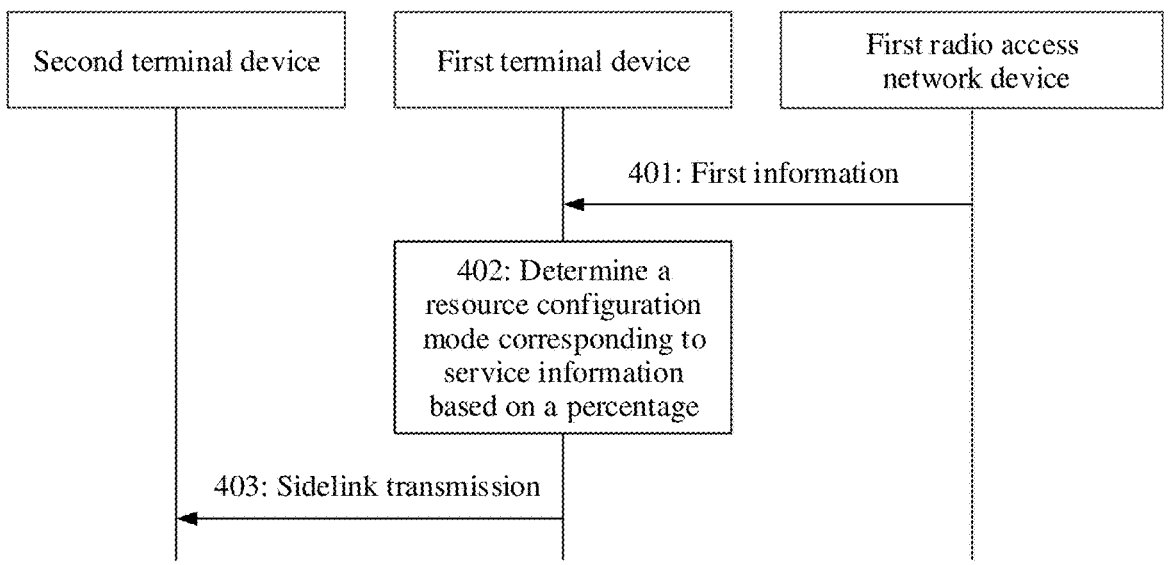
FIG. 4 is a schematic flowchart of a communication method according to the embodiments.

FIG. 4 is a schematic flowchart of a communication method according to the embodiments. The solutions in the embodiments are described below with reference to FIG. 4. For example, the communication method 400 corresponding to FIG. 4 may include the following steps.

Operation 401: For this operation, refer to operation 201, and an optional part of operation 201 may be included. Details are not described herein again.

Operation 402: The first terminal device determines, based on a percentage, the resource configuration mode corresponding to the service information.

For example, in the third case in operation 401, that is, when the first terminal device may transmit the data corresponding to the service information on the sidelink transmission resource configured based on the first resource configuration mode, or may transmit the data corresponding to the service information on the sidelink transmission resource configured based on the second resource configuration mode, the first terminal device may determine, based on the percentage, the resource configuration mode corresponding to the service information. For example, the following may be included:

The first terminal device divides the data corresponding to the service information into a first part and a second part based on the percentage. Optionally, the data corresponding to the service information may be divided into a first part and a second part in another manner. This is not limited in this embodiment. The first terminal device transmits the first part on the sidelink transmission resource configured based on the first resource configuration mode and transmits the second part on the sidelink transmission resource configured based on the second resource configuration mode.

In this implementation, based on the percentage, some data may be transmitted on the sidelink transmission resource configured based on the mode 3, or some data may be transmitted on the sidelink transmission resource configured based on the mode 4. For example, beneficial effects include: the terminal device can transmit, in a balanced way, data on the sidelink transmission resource configured based on the mode 3 or on the sidelink transmission resource configured based on the mode 4.

For example, the percentage may be 60%. In this case, the first part may include 60% of the data corresponding to the service information, and the second part may include 40% of the data corresponding to the service information. For example, it is specified that the first terminal device transmits the first part on the sidelink transmission resource configured based on the first resource configuration mode and transmits the second part on the sidelink transmission resource configured based on the second resource configuration mode. Additionally, it may alternatively be specified that the first terminal device may transmit the first part on the sidelink transmission resource configured based on the second resource configuration mode, and transmit the second part on the sidelink transmission resource configured based on the first resource configuration mode.

Optionally, the first radio access network device sends information to the first terminal device, where the information may include the percentage. Optionally, the device vendor may store the percentage in the first terminal device before delivery of the first terminal device, or the network device may pre-configure the percentage in the first terminal device when the first terminal device is able to connect to a network. For example, the first terminal device stores the percentage in a memory, and the first terminal device can read the percentage from the memory. In this implementation, for example, beneficial effects include: the percentage may be set by the network side device and sent to the terminal device. The network side device may configure the percentage according to an actual situation. Alternatively, the percentage may be stored in the terminal device in advance and does not need to be obtained via another device. This reduces signaling overheads between devices.

Operation 403: For this operation, refer to operation 203, and an optional part of operation 203 may be included. Details are not described herein again.

For example, in FIG. 4, the first terminal device or a second terminal device may be a vehicle device, and the first radio access network device or a second radio access network device may be an eNB base station in an LTE standard, a gNB base station in an NR standard, a master node in a dual-connectivity communications architecture, or a secondary node in a dual-connectivity communications architecture.

Figure 5:
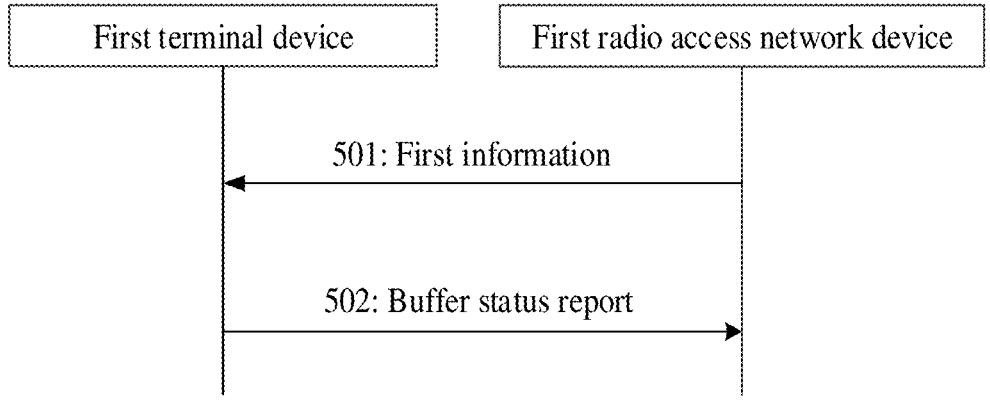
FIG. 5 is a schematic flowchart of a communication method according to the embodiments.

FIG. 5 is a schematic flowchart of a communication method according to the embodiments. How a transmission reliability requirement and a transmission delay of service data are both considered in a process in which a terminal device sends a buffer status report (BSR) to a radio access network device is described as an example below with reference to FIG. 5.

Generally, the service data of the terminal device may trigger a BSR. The terminal device generates a sidelink BSR MAC CE based on the transmission resource. The sidelink BSR MAC CE may include a data buffer size corresponding to at least one logical channel group. The sidelink BSR MAC CE is reported, so that a network device learns of buffer information (for example, the buffer information may include a sum of a data buffer size at a PDCP layer and a data buffer size at an RLC layer) of the terminal device, and the network device allocates, to the terminal device, a sidelink transmission resource configured based on a mode 3. The terminal reports the sidelink BSR MAC CE at a granularity of a logical channel group. For example, a logical channel group 1 may include a logical channel 1 and a logical channel 2, and a logical channel group 2 may include a logical channel 3. When the terminal device reports the sidelink BSR MAC CE, a data buffer size corresponding to the logical channel group 1 may be calculated as a sum of data buffer sizes corresponding to the logical channel 1 and the logical channel 2, and a data buffer size corresponding to the logical channel group 2 may be calculated as a data size corresponding to the logical channel 3. When receiving the sidelink BSR MAC CE reported by the terminal device, the network device may allocate a sidelink transmission resource of a corresponding size to the terminal device.

For example, the communication method 500 corresponding to FIG. 5 may include the following steps.

Operation 501: For this operation, refer to operation 201, and an optional part of operation 201 may be included. Details are not described herein again.

Operation 502: The first terminal device sends a buffer status report to the first radio access network device.

For example, the first terminal device may send the buffer status report to the first radio access network device based on the correspondence. For example, the following may be included:

For example, a correspondence between service information 1 and the resource configuration mode may be that data corresponding to the service information 1 can be transmitted only on the sidelink transmission resource configured based on the first resource configuration mode, and cannot be transmitted on the sidelink transmission resource configured based on the second resource configuration mode. For example, the first resource configuration mode is a mode 3, in a first standard, of the first radio access network device. In this case, because a resource needs to be applied to a network side device in the first resource configuration mode, the service information 1 may be associated with a logical channel group. For example, the service information 1 may be associated with the logical channel group 1.

In this case, for example, a correspondence between service information 2 and the resource configuration mode may be that data corresponding to the service information 2 can be transmitted only on the sidelink transmission resource configured based on the second resource configuration mode, and cannot be transmitted on the sidelink transmission resource configured based on the first resource configuration mode. For example, the second resource configuration mode is a mode 4, in the first standard, of the first radio access network device. In this case, because a resource does not need to be applied to a network side device in the second resource configuration mode, the service information 2 may be not associated with any logical channel group.

For example, a correspondence between service information 3 and the resource configuration mode may be the third case in operation 501. For example, data corresponding to the service information 3 may be transmitted not only on the sidelink transmission resource configured based on the first resource configuration mode, but also on the sidelink transmission resource configured based on the second resource configuration mode. For example, the first resource configuration mode is a mode 3, in a first standard, of the first radio access network device, and the second resource configuration mode is a mode 4, in the first standard, of the first radio access network device. In this case, the service information 3 may be associated with a logical channel group. For example, the service information 3 may be associated with the logical channel group 2.

In this case, for example, the first terminal device reports buffer information of the logical channel group 1 and buffer information of the logical channel group 2 to the first radio access network device. To calculate the buffer information of the logical channel group 1, only a data buffer size corresponding to the service information 1 needs to be calculated. For example, it is assumed that a data buffer size of data corresponding to the service information 1 is 100 bytes, a data buffer size of data corresponding to the service information 2 is 150 bytes, and a data buffer size of data corresponding to the service information 3 is 200 bytes. The buffer information of the logical channel group 2 may be calculated by using any one of the following calculation methods:

① The buffer information of the logical channel group 2 may be the data buffer size of the data corresponding to the service information 3, that is, 200 bytes.

② If the data buffer size of the data corresponding to the service information 3 is greater than or equal to a threshold, the buffer information of the logical channel group 2 may be the data buffer size of the data corresponding to the service information 3, that is, 200 bytes. In this implementation, a data size of data corresponding to service information whose data buffer size is relatively large may be directly included in the buffer status report. For example, beneficial effects include: this can simplify calculation of the buffer status report or reduce a delay in resource application and scheduling.

③ If the data buffer size of the data corresponding to the service information 3 is less than or equal to a threshold, the first radio access network device sends second information to the first terminal device, where the second information may include indication information, and the indication information is used to indicate that the data corresponding to the service information can be transmitted only on the sidelink transmission resource configured based on the first resource configuration mode. In this case, the buffer information of the logical channel group 2 may be the data buffer size of the data corresponding to the service information 3, that is, 200 bytes.

④ If the data buffer size of the data corresponding to the service information 3 is less than or equal to a threshold, the first radio access network device sends second information to the first terminal device, where the second information may include indication information, and the indication information is used to indicate that the data corresponding to the service information can be transmitted only on the sidelink transmission resource configured based on the second resource configuration mode. In this case, when the buffer information of the logical channel group 2 is calculated, the data buffer size of the data corresponding to the service information 3 may be considered as zero, that is, 0 bytes. In this implementation, for example, beneficial effects include: the network side device may flexibly indicate, according to an actual situation, whether a data size of service data whose data buffer size is less than or equal to a threshold is calculated in the buffer status report sent by the terminal device to the radio access network device, to flexibly manage overheads of the buffer status report.

⑤ If the data corresponding to the service information 3 is divided into a first part and a second part based on the percentage, the first terminal device transmits the first part on the sidelink transmission resource configured based on the first resource configuration mode, and transmits the second part on the sidelink transmission resource configured based on the second resource configuration mode. If the percentage is 50%, a data size of the first part transmitted on the sidelink transmission resource configured based on the first resource configuration mode is 100 bytes (200*50%=100). In this case, only the first part may be associated with the logical channel group 2, and the buffer information of the logical channel group 2 may be the data buffer size of the first part, that is, 100 bytes. In this implementation, data corresponding to a specific type of service information may be divided into two parts based on a percentage. For example, beneficial effects include: this can reduce overheads occupied by the buffer status report sent by the terminal device to the radio access network device, reduce system signaling overheads, or reduce a resource scheduled by the radio access network device for the terminal device based on the buffer status report, to alleviate system resource shortage.

For example, the correspondence between service information 3 and the resource configuration mode may be the third case in operation 501. For example, the data corresponding to the service information 3 may be transmitted not only on the sidelink transmission resource configured based on the first resource configuration mode, but also on the sidelink transmission resource configured based on the second resource configuration mode. For example, the first resource configuration mode may be the mode 3, in the first standard, of the first radio access network device, and the second resource configuration mode may be a mode 3, in the first standard, of a second radio access network device. In this case, that the terminal device reports the buffer status report to the network side device may include any one of the following cases:

① If the data buffer size of the data corresponding to the service information 3 is greater than or equal to the threshold, the buffer status report may be sent to the first radio access network device, and the buffer status report may be sent to the second radio access network device. In this implementation, for example, beneficial effects include: when the data buffer size is relatively large, for example, the data buffer size is greater than or equal to a threshold, compared with a case in which the buffer status report is sent only to the first radio access network device or only to the second radio access network device, service data can be transmitted more quickly in this case. ② If the data buffer size of the data corresponding to the service information 3 is less than or equal to the threshold, the first radio access network device sends the second information to the first terminal device, where the second information may include the indication information, and the indication information is used to indicate that the data corresponding to the service information 3 can be transmitted only on the sidelink transmission resource configured based on the first resource configuration mode. In this case, the terminal device can send the buffer status report only to the first radio access network device. In this implementation, for example, beneficial effects include: compared with a case in which the buffer status report is sent to both the first radio access network device and the second radio access network device, this can reduce system signaling overheads or relieve system resource shortage.

③ If the data buffer size of the data corresponding to the service information 3 is less than or equal to the threshold, the first radio access network device sends the second information to the first terminal device, where the second information may include the indication information, and the indication information is used to indicate that the data corresponding to the service information 3 can be transmitted only on the sidelink transmission resource configured based on the second resource configuration mode. In this case, the terminal device may send the buffer status report to the second radio access network device. The first terminal device, the first radio access network device, and the second radio access network device may form a dual-connectivity network architecture.

It may be understood that, during specific implementation, the first information and the second information may be same information or information of a same type, the first information and the second information may be carried in a same piece of information or information of a same type, or the first information and the second information may be a same piece of information or information of a same type. This is not limited in the embodiments.

Optionally, a device vendor may store content of the second information in the first terminal device before delivery of the first terminal device, or a network device may pre-configure content of the second information in the first terminal device when the first terminal device is able to connect to a network. For example, the first terminal device stores the content of the second information in a memory, and the first terminal device can read the content of the second information from the memory. In this implementation, for example, beneficial effects include: the content of the second information may be stored in the terminal device in advance, and does not need to be obtained via another device. This reduces signaling overheads between devices.

Optionally, the first radio access network device sends information to the first terminal device, where the information may include the threshold. Optionally, the device vendor may store the threshold in the first terminal device before delivery of the first terminal device, or the network device may pre-configure the threshold in the first terminal device when the first terminal device is able to connect to a network. For example, the first terminal device stores the threshold in the memory, and the first terminal device can read the threshold from the memory. In this implementation, for example, beneficial effects include: the threshold may be set by the network side device and sent to the terminal device. The network side device may configure the threshold according to an actual situation. Alternatively, the threshold may be stored in the terminal device in advance and does not need to be obtained via another device. This reduces signaling overheads between devices.

Optionally, the first radio access network device sends information to the first terminal device, where the information may include the percentage. Optionally, the device vendor may store the percentage in the first terminal device before delivery of the first terminal device, or the network device may pre-configure the percentage in the first terminal device when the first terminal device is able to connect to a network. For example, the first terminal device stores the percentage in the memory, and the first terminal device can read the percentage from the memory. In this implementation, for example, beneficial effects include: the percentage may be set by the network side device and sent to the terminal device. The network side device may configure the percentage according to an actual situation. Alternatively, the percentage may be stored in the terminal device in advance and does not need to be obtained via another device. This reduces signaling overheads between devices.

In this implementation, when a correspondence between a specific type of service information and a resource configuration mode is that data corresponding to the service information is transmitted on a sidelink transmission resource configured based on either a mode 3 or a mode 4, which is not limited, for the data corresponding to the service information, the terminal device may send, by using a plurality of reporting methods, the buffer status report to the radio access network device to apply to the radio access network device for a sidelink transmission resource. For example, beneficial effects include: overheads of the buffer status report or a size of a resource scheduled by the radio access network device for the terminal device based on the buffer status report can be effectively and properly managed.

For example, in FIG. 5, the first terminal device or a second terminal device may be a vehicle device, and the first radio access network device or a second radio access network device may be an eNB base station in an LTE standard, a gNB base station in an NR standard, a master node in a dual-connectivity communications architecture, or a secondary node in a dual-connectivity communications architecture.

Figure 6:
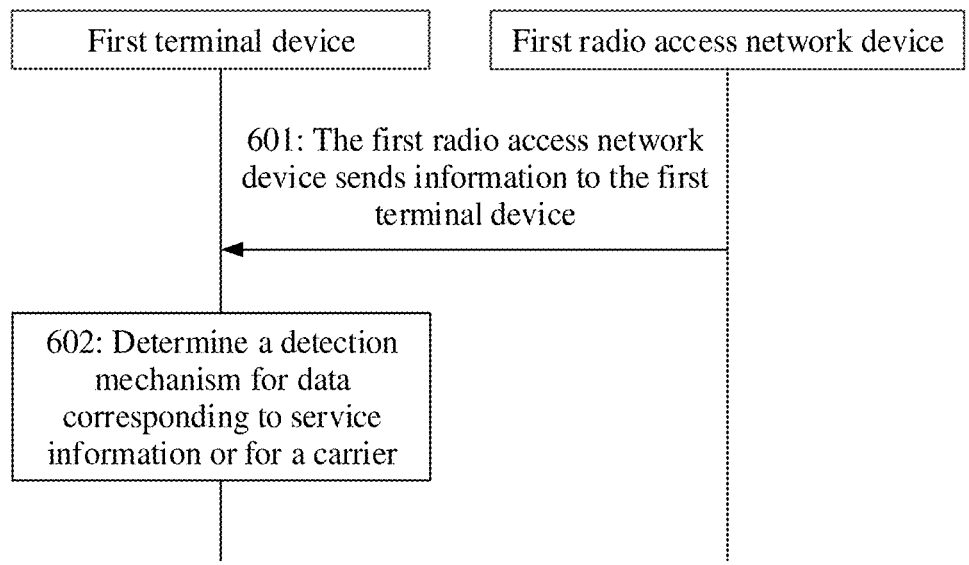
FIG. 6 is a schematic flowchart of a communication method according to the embodiments.

FIG. 6 is a schematic flowchart of a communication method according to the embodiments. The solutions in the embodiments are described below with reference to FIG. 6. For example, the communication method 600 corresponding to FIG. 6 may include the following steps.

Operation 601: A first radio access network device sends information to a first terminal device.

For example, the information may include a mapping relationship between service information and a detection mechanism. Optionally, the information may further include a mapping relationship between a carrier or a resource pool selected by the terminal device and the detection mechanism.

The detection mechanism may be a mechanism in which the terminal device determines, through measurement, whether a carrier or a resource pool is available, for example, determines, through channel busy ratio (CBR) measurement, whether the resource pool or the carrier can be configured as a sidelink transmission resource that can be used to send data.

Generally, there may be two detection mechanisms. In a first detection mechanism, whether a current resource pool or carrier can be configured as a sidelink transmission resource used to send data is determined based on historical statistics. For example, in a specified time, the terminal device calculates, through received signal strength indicator (RSSI) measurement, a ratio of a quantity of subchannels exceeding a preset threshold to a total quantity of subchannels. If the ratio is greater than a preset ratio, it indicates that the resource pool or the carrier can be configured as a sidelink transmission resource used to send data. Otherwise, the resource pool or the carrier cannot be configured as a sidelink transmission resource used to send data. One carrier may include at least one resource pool.

In a second detection mechanism, whether a current resource pool or carrier can be configured as a sidelink transmission resource used to send data is determined based on real-time detection. For example, whether the current resource pool or carrier is available may be determined based on currently implemented RSSI measurement. For a specific measurement method, refer to the first monitoring mechanism. Details are not described herein again.

For example, parameters corresponding to the first detection mechanism and the second detection mechanism may be different, for example, window length parameters corresponding to the first detection mechanism and the second detection mechanism may be different. Optionally, the first terminal device may determine, based on a channel status in a window, whether the current resource pool or carrier can be configured as a sidelink transmission resource used to send data.

Operation 602: Determine a detection mechanism for data corresponding to the service information or a detection mechanism for a carrier/resource pool.

For example, when the information may include the mapping relationship between the service information and the detection mechanism type, service information 1 is associated with the first detection mechanism, and service information 2 is associated with the second detection mechanism. When the terminal needs to send data of the service information 1, the first detection mechanism is used for detection. When the terminal needs to send data of the service information 2, the second detection mechanism is used for detection.

For example, when the information may include the mapping relationship between the carrier/resource pool and the detection mechanism type, a carrier/resource pool 1 is associated with the first detection mechanism, and a carrier/resource pool 2 is associated with the second detection mechanism. When the terminal determines to use the carrier/resource pool 1, the first detection mechanism associated with the carrier/resource pool 1 is used for detection. When the terminal determines to use the carrier/resource pool 2, the second detection mechanism associated with the carrier/resource pool 2 is used for detection.

In this implementation, the terminal device may select appropriate detection mechanisms based on different service information corresponding to different service data or based on different selected carriers or resource pools, to determine whether a current resource pool or carrier can be configured as a sidelink transmission resource that can be used to send data. For example, beneficial effects include: the terminal device can use an appropriate detection mechanism according to different actual situations, to detect in a timely manner whether a current resource pool or carrier can be configured as a sidelink transmission resource used to send data.

For example, in FIG. 6, the first terminal device or a second terminal device may be a vehicle device, and the first radio access network device or a second radio access network device may be an eNB base station in an LTE standard, a gNB base station in an NR standard, a master node in a dual-connectivity communications architecture, or a secondary node in a dual-connectivity communications architecture.

Figure 7:
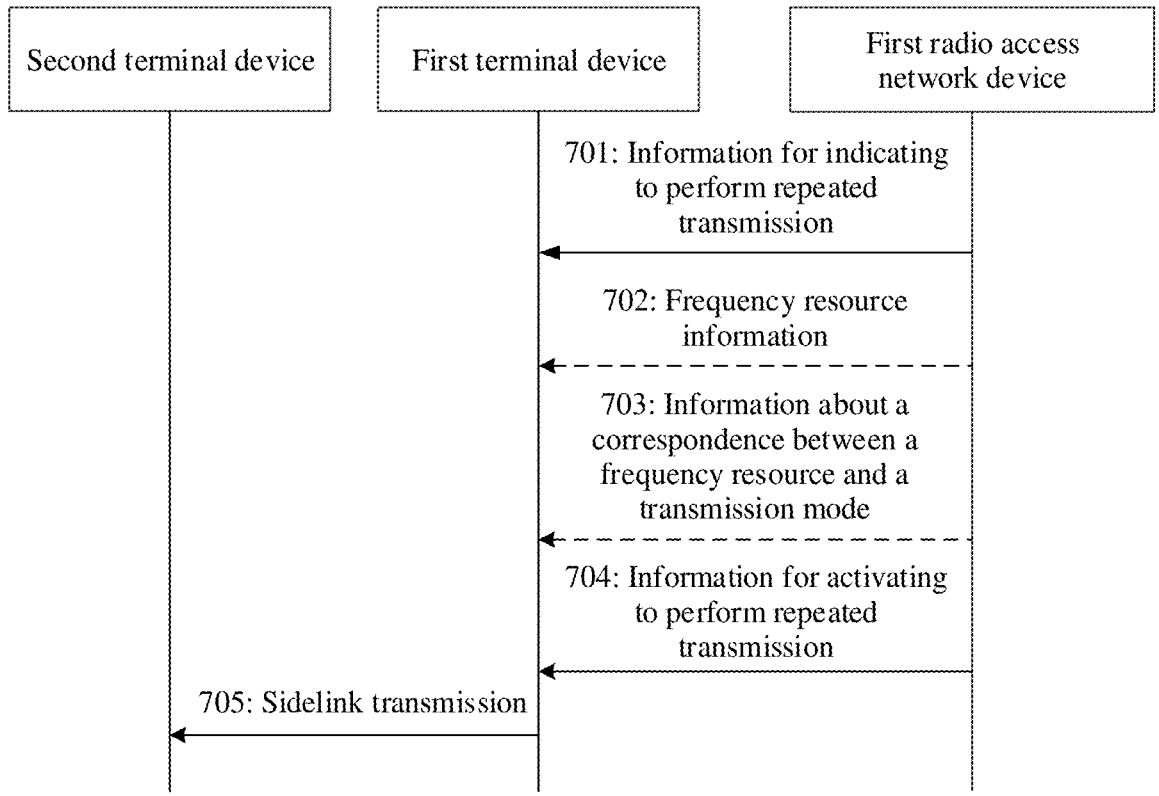
FIG. 7 is a schematic flowchart of a communication method according to the embodiments.

FIG. 7 is a schematic flowchart of a communication method according to the embodiments. The solutions in the embodiments are described below with reference to FIG. 7. For example, the communication method 700 corresponding to FIG. 7 may include the following steps.

Operation 701: A first radio access network device sends, to a first terminal device, information for indicating the first terminal device to perform repeated transmission.

For example, the information for indicating the first terminal device to perform repeated transmission may include any one of the following:

For example, the first terminal device is indicated to transmit data corresponding to service information that is on a sidelink and repeated data of the data corresponding to the service information that is on the sidelink on a sidelink transmission resource configured based on a first resource configuration mode.

For example, the first terminal device is indicated to transmit data corresponding to service information that is on a sidelink and repeated data of the data corresponding to the service information that is on the sidelink on a sidelink transmission resource configured based on a second resource configuration mode.

For example, the first terminal device is indicated to transmit data corresponding to service information that is on a sidelink on a sidelink transmission resource configured based on a first resource configuration mode, and to transmit repeated data of the data corresponding to the service information that is on the sidelink on a sidelink transmission resource configured based on a second resource configuration mode.

For example, the first terminal device is indicated to transmit repeated data of data corresponding to service information that is on a sidelink on a sidelink transmission resource configured based on a first resource configuration mode, and to transmit the data corresponding to the service information that is on the sidelink on a sidelink transmission resource configured based on a second resource configuration mode. In this implementation, for example, beneficial effects include: the terminal device can improve, through repeated transmission, reliability of data transmission on a sidelink.

For example, when receiving the information indicating to perform repeated transmission, the first terminal device does not immediately perform data replication, in other words, does not immediately transmit, according to the indication, repeated data obtained by replicating the data corresponding to the service information. In this case, the first terminal device transmits only the data corresponding to the service information but does not transmit the repeated data. The first terminal device transmits, according to the indication only when receiving repeated-transmission activation information, the repeated data obtained by replicating the data corresponding to the service information.

Operation 702: The first radio access network device sends frequency resource information to the first terminal device.

For example, the information may include information about a first frequency resource set and information about a second frequency resource set.

For example, a frequency resource may be at least one band, at least one component carrier, or at least one serving cell, and a frequency resource set may be a band combination, a component carrier set, or a serving cell set, where each BC may include at least one band.

Operation 702 is an optional operation. For example, when the first terminal device selects the frequency resource information, the first radio access network device does not need to send the frequency resource information to the first terminal device.

Operation 703: The first radio access network device sends information about a correspondence between the frequency resource information and a resource configuration mode to the first terminal device.

For example, the information may include indicating that the sidelink transmission resource configured based on the first resource configuration mode may be the first frequency resource set, or the information may include indicating that the sidelink transmission resource configured based on the second resource configuration mode may be the second frequency resource set.

Operation 703 is an optional operation. For example, when the first terminal device selects the frequency resource information, the first radio access network device does not need to send the information about a correspondence between the frequency resource information and the resource configuration mode to the first terminal device.

Operation 704: The first radio access network device sends, to the first terminal device, information for activating the first terminal device to perform repeated transmission.

For example, the information for activating to perform repeated transmission may include any one of the following cases:

In a first case, when the information for indicating to perform repeated transmission may include indicating the first terminal device to transmit the data corresponding to the service information that is on the sidelink and the repeated data of the data corresponding to the service information that is on the sidelink on the sidelink transmission resource configured based on the first resource configuration mode, the first terminal device is activated to transmit the repeated data of the data corresponding to the service information that is on the sidelink on the sidelink transmission resource configured based on the first resource configuration mode.

In a second case, when the information for indicating to perform repeated transmission may include indicating the first terminal device to transmit the data corresponding to the service information that is on the sidelink and the repeated data of the data corresponding to the service information that is on the sidelink on the sidelink transmission resource configured based on the second resource configuration mode, the first terminal device is activated to transmit the repeated data of the data corresponding to the service information that is on the sidelink on the sidelink transmission resource configured based on the second resource configuration mode.

In a third case, when the information for indicating to perform repeated transmission may include indicating the first terminal device to transmit the data corresponding to the service information that is on the sidelink on the sidelink transmission resource configured based on the first resource configuration mode, and to transmit the repeated data of the data corresponding to the service information that is on the sidelink on the sidelink transmission resource configured based on the second resource configuration mode, the first terminal device is activated to transmit the repeated data of the data corresponding to the service information that is on the sidelink on the sidelink transmission resource configured based on the second resource configuration mode.

In a fourth case, when the information for indicating to perform repeated transmission may include indicating the first terminal device to transmit the repeated data of the data corresponding to the service information that is on the sidelink on the sidelink transmission resource configured based on the first resource configuration mode, and to transmit the data corresponding to the service information that is on the sidelink on the sidelink transmission resource configured based on the second resource configuration mode, the first terminal device is activated to transmit the repeated data of the data corresponding to the service information that is on the sidelink on the sidelink transmission resource configured based on the first resource configuration mode.

In a fifth case, the first terminal device is not activated or is deactivated to transmit the repeated data of the data corresponding to the service information that is on the sidelink. Information for skipping activating the first terminal device to transmit the repeated data of the data corresponding to the service information that is on the sidelink may be indicating the first terminal device not to perform an operation of replicating or repeatedly transmitting the data corresponding to the service information, and information for deactivating the first terminal device to transmit the repeated data of the data corresponding to the service information that is on the sidelink may be indicating the first terminal device to cancel the operation of replicating or repeatedly transmitting the data corresponding to the service information. In this case, the first radio access device further needs to send, to the first terminal device, information for indicating the first terminal device to transmit the data corresponding to the service information that is on the sidelink on the sidelink transmission resource configured based on the first resource configuration mode, or information for indicating the first terminal device to transmit the data corresponding to the service information that is on the sidelink on the sidelink transmission resource configured based on the second resource configuration mode. In this implementation, when the information for activating the first terminal device to perform repeated transmission is received, the terminal device can be notified of a specific resource configuration mode in a timely manner, where a sidelink transmission resource on which the data corresponding to the service information can be transmitted is configured based on the specific resource configuration mode.

In this implementation, the information for activating the first terminal device to perform repeated transmission may be set by a network side device and sent to the terminal device. The network side device may determine, according to an actual situation, whether repeated transmission needs to be performed to improve reliability of data transmission on a sidelink, or determine which type of repeated transmission is selected to improve reliability of data transmission on a sidelink, thereby improving system flexibility.

For example, the information for activating to perform repeated transmission may be a MAC CE.

For example, when the first radio access network device indicates the first terminal device to transmit the data corresponding to the service information that is on the sidelink on the sidelink transmission resource configured based on the first resource configuration mode, and to transmit the repeated data of the data corresponding to the service information that is on the sidelink on the sidelink transmission resource configured based on the second resource configuration mode, the data corresponding to the service information may be mapped to two different logical channels, and the two different logical channels may be mapped to a same MAC entity. For example, the two different logical channels may be a first logical channel and a second logical channel, data on the first logical channel may be transmitted on the sidelink transmission resource configured based on the first resource configuration mode, and data on the second logical channel may be transmitted on the sidelink transmission resource configured based on the second resource configuration mode. For indication information indicating a resource configuration mode based on which a sidelink transmission resource configured to transmit the first logical channel and the second logical channel, content of the indication information may be stored in the first terminal device by a device vendor before delivery of the first terminal device, or may be pre-configured by a network device in the first terminal device when the first terminal device is able to connect to a network. For example, the first terminal device stores the content of the indication information in a memory, and the first terminal device can read the content of the indication information from the memory.

For example, when the first resource configuration mode is a mode 3, and the second resource configuration mode is a mode 4, the to-be-transmitted data on the first logical channel may be used to trigger a buffer status report, and the buffer status report may include a data size corresponding to the buffered data on the first logical channel. The second logical channel cannot be used to trigger the buffer status report, and the buffer status report reported by the first terminal device to the radio access network device may not include a data size corresponding to buffered data on the second logical channel. The buffer status report sent by the first terminal device to the radio access network device may be used by the radio access network device to obtain a status of a buffer area of the first terminal device, to assist the radio access network device in resource scheduling.

The first resource configuration mode may be the mode 3, and the second resource configuration mode may be the mode 4. In this implementation, for example, beneficial effects include: the terminal device can use, in a balanced way, sidelink transmission resources configured based on different resource configuration modes.

Optionally, the first resource configuration mode and the second resource configuration mode may alternatively be resource configuration modes in different standards. For example, the first resource configuration mode may be a mode 3 in an LTE standard, and the second resource configuration mode may be a mode 3 in an NR standard. For example, the first resource configuration mode may be a mode 3 in an LTE standard, and the second resource configuration mode may be a mode 4 in an NR standard. A system of first standard and a system of second standard are communication systems of two different standards, and a difference between the first standard and the second standard may include at least a waveform parameter, a modulation scheme, a bandwidth configuration, a radio frame configuration mode, a resource multiplexing mode, and a coding scheme. For example, the system of the first standard may be an LTE mobile communications system, and a system of the second standard may be a 5G mobile communications system or an NR system. The mode 3 in the LTE standard and the mode 3 in the NR standard may be resource configuration modes belonging to a same radio access network device. The radio access network device may be an LTE eNB base station or may be an NR gNB base station. On one hand, the terminal device may distinguish whether a resource allocated by the radio access network device is an LTE resource or an NR resource in two manners. In one manner, the terminal device distinguishes whether the resource allocated by the radio access network device is an LTE resource or an NR resource, based on different RNTIs corresponding to DCI of the LTE resource and the NR resource allocated by the radio access network device. In another manner, when the radio access network device allocates an LTE resource and an NR resource to the terminal, the LTE resource and the NR resource share a DCI format, and a reserved bit in DCI is used to indicate whether a resource allocated to the terminal device is an LTE resource or an NR resource. On the other hand, the radio access network device may distinguish between terminal devices by using a CRC bit of DCI scrambled by using an RNTI, and only a terminal device that has the corresponding RNTI can accurately receive the DCI. In this implementation, for example, beneficial effects include: the terminal device can use, in a balanced way, sidelink transmission resources configured based on resource configuration modes in different standards.

Optionally, the first resource configuration mode and the second resource configuration mode may alternatively be resource configuration modes configured by different radio access network devices. For example, the first resource configuration mode may be a mode 3 of the first radio access network device, and the second resource configuration mode may be a mode 3 of a second radio access network device. For example, the first terminal device, the first radio access network device, and the second radio access network device may form a dual-connectivity communications architecture. For example, in the dual-connectivity communications architecture, a terminal device may have communication connections to two radio access network devices at the same time and can receive and send data. One of the two radio access network devices may be responsible for exchanging radio resource control information with the terminal device, and responsible for interacting with a core network control plane entity. In this case, the radio access network device may be referred to as a master node, and the other radio access network device may be referred to as a secondary node. For example, the first radio access network device may be a master node in the dual-connectivity communications architecture, and the second radio access network device may be a secondary node in the dual-connectivity communications architecture. Alternatively, the first radio access network device may be a secondary node in dual-connectivity, and the second radio access network device may be an master node in dual-connectivity. In this implementation, for example, beneficial effects include: the terminal device can use, in a balanced way, sidelink transmission resources configured by different radio access network devices for the terminal device.

Operation 705: The first terminal device transmits data on the sidelink.

The first terminal device transmits, on the sidelink based on the information that is sent by the radio access network device and that is for indicating the first terminal device to perform repeated transmission and/or for activating the first terminal device to perform repeated transmission, the data corresponding to the service information and/or the repeated data of the data corresponding to the service information.

For example, the information that is obtained by the first terminal device and that indicates to perform repeated transmission is indicating the first terminal device to transmit the data corresponding to the service information that is on the sidelink on the sidelink transmission resource configured based on the mode 3 and to transmit the repeated data of the data corresponding to the service information that is on the sidelink on the sidelink transmission resource configured based on the mode 4. In this case, the first terminal device may transmit the data corresponding to the service information that is on the sidelink on the sidelink transmission resource configured based on the mode 3. If the first terminal device further obtains the information for activating the repeated transmission, and the activation information is: when the information for indicating the repeated transmission may include indicating the first terminal device to transmit the data corresponding to the service information that is on the sidelink on the sidelink transmission resource configured based on the mode 3 and to transmit the repeated data of the data corresponding to the service information that is on the sidelink on the sidelink transmission resource configured based on the mode 4, activating the first terminal device to transmit the repeated data of the data corresponding to the service information that is on the sidelink on the sidelink transmission resource configured based on the mode 4, the first terminal device may replicate the data corresponding to the service information to obtain the repeated data of the data corresponding to the service information, and then transmit the repeated data of the data corresponding to the service information that is on the sidelink on the sidelink transmission resource configured based on the mode 4.

The data that is corresponding to the service information that may be transmitted on the sidelink transmission resource configured based on the mode 3 may be mapped to the first logical channel, and the repeated data that is of the data corresponding to the service information and that may be transmitted on the sidelink transmission resource configured based on the mode 4 may be mapped to the second logical channel.

In this case, if a sidelink transmission resource obtained by the first terminal device is the sidelink transmission resource configured based on the mode 3, and the transmission resource is the information about the first frequency resource set, because the data that is corresponding to the service information and that may be transmitted on the sidelink transmission resource configured based on the mode 3 is mapped to the first logical channel, the first terminal device may allocate, only to the first logical channel, the sidelink transmission resource that is configured based on the mode 3 and that is obtained by the first terminal device.

In this implementation, when the radio access network device activates the first terminal device to perform repeated transmission, if the first terminal device obtains only a sidelink transmission resource configured based on a specific resource configuration mode in this case, data corresponding to service information corresponding to the resource configuration mode or repeated data of the data corresponding to the service information may be first transmitted. That is, the terminal device may first allocate a sidelink transmission resource obtained by the terminal device to a logical channel to which the data corresponding to the service information is mapped. For example, beneficial effects are as follows: after the first terminal device is activated to perform repeated transmission, a sidelink transmission resource may be flexibly and effectively configured for the data corresponding to the service information or the repeated data of the data corresponding to the service information.

For example, in FIG. 7, the first terminal device or a second terminal device may be a vehicle device, and the first radio access network device or a second radio access network device may be an eNB base station in an LTE standard, a gNB base station in an NR standard, a master node in a dual-connectivity communications architecture, or a secondary node in a dual-connectivity communications architecture.

Based on a same concept, the embodiments provide a communications apparatus. The apparatus may be the first terminal device, the first radio access network device, or the second radio access network device in any possible solution of the communication methods/systems provided in the methods 200 to 700 in the foregoing embodiments. The communications apparatus may include at least one corresponding unit configured to perform a method step, an operation, or an action performed by the first terminal device, the first radio access network device, or the second radio access network device in the communication methods/systems provided in the methods 200 to 700. The at least one unit may be set to have a one-to-one correspondence with the method step, the operation, or the action performed by the network device. These units may be implemented by using a computer program, a hardware circuit, or a computer program in combination with a hardware circuit.

Figure 8:
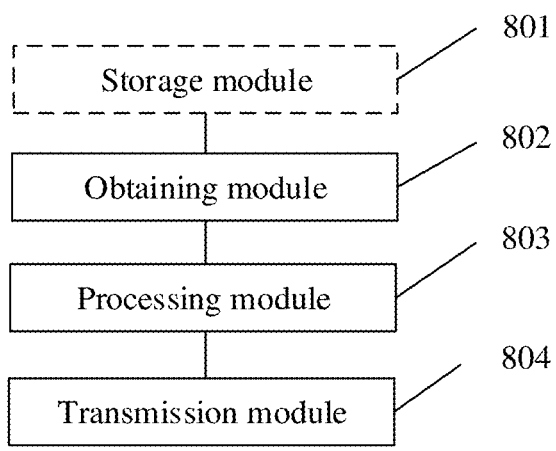
FIG. 8 is a schematic block diagram of a terminal device according to the embodiments.

The embodiments further provide a terminal device, configured to implement a function performed by the first terminal device in the foregoing embodiments. A structure and a function of a terminal device 800 are described below with reference to FIG. 8 in the embodiments. FIG. 8 is a schematic block diagram of the terminal device 800 according to the embodiments.

For example, the terminal device 800 may include: an obtaining module 802 configured to receive first information from a radio access network device, where the first information may include service information of a service of the first terminal device and a resource configuration mode on a sidelink, and there is a correspondence between the service information and the resource configuration mode on the sidelink; a transmission module 804, configured to transmit data corresponding to the service information on a sidelink transmission resource configured based on the resource configuration mode; and a processing module 803, configured to enable, based on the correspondence obtained by the obtaining module 802, the transmission module 804 to transmit the data corresponding to the service information on the sidelink transmission resource configured based on the resource configuration mode, where the sidelink is a wireless communications link between the terminal device and another terminal device.

For example, that the processing module 803 enables, based on the correspondence obtained by the obtaining module 802, the transmission module 804 to transmit the data corresponding to the service information on the sidelink transmission resource configured based on the resource configuration mode, may include any one of the following: when the resource configuration mode on the sidelink is a first resource configuration mode, the processing module 803 enables, based on the correspondence obtained by the obtaining module 802, the transmission module 804 to transmit the data corresponding to the service information on a sidelink transmission resource configured based on the first resource configuration mode; or when the resource configuration mode on the sidelink is a second resource configuration mode, the processing module 803 enables, based on the correspondence obtained by the obtaining module 802, the transmission module 804 to transmit the data corresponding to the service information on a sidelink transmission resource configured based on the second resource configuration mode; or when the resource configuration mode on the sidelink is at least one of a first resource configuration mode and a second resource configuration mode, the processing module 803 enables, based on the correspondence obtained by the obtaining module 802, the transmission module 804 to transmit the data corresponding to the service information on a sidelink transmission resource configured based on the at least one of the first resource configuration mode and the second resource configuration mode.

When the resource configuration mode on the sidelink is at least one of the first resource configuration mode and the second resource configuration mode, that the processing module 803 enables, based on the correspondence obtained by the obtaining module 802, the transmission module 804 to transmit the data corresponding to the service information on the sidelink transmission resource configured based on the at least one of the first resource configuration mode and the second resource configuration mode may include any one of the following: when a data buffer size of the data corresponding to the service information is greater than or equal to a threshold, and the obtaining module 802 obtains the sidelink transmission resource configured based on the first resource configuration mode, the processing module 803 enables the transmission module 804 to transmit the data corresponding to the service information on the sidelink transmission resource configured based on the first resource configuration mode; or when a data buffer size of the data corresponding to the service information is greater than or equal to a threshold, and the obtaining module 802 obtains the sidelink transmission resource configured based on the second resource configuration mode, the processing module 803 enables the transmission module 804 to transmit the data corresponding to the service information on the sidelink transmission resource configured based on the second resource configuration mode; or when a data buffer size of the data corresponding to the service information is greater than or equal to a threshold, and the obtaining module 802 obtains the sidelink transmission resource configured based on the first resource configuration mode and the sidelink transmission resource configured based on the second resource configuration mode, the processing module 803 enables the transmission module 804 to transmit the data corresponding to the service information on the sidelink transmission resource configured based on the first resource configuration mode and on the sidelink transmission resource configured based on the second resource configuration mode.

When the resource configuration mode on the sidelink is at least one of the first resource configuration mode and the second resource configuration mode, that the processing module 803 enables, based on the correspondence obtained by the obtaining module 802, the transmission module 804 to transmit the data corresponding to the service information on the sidelink transmission resource configured based on the at least one of the first resource configuration mode and the second resource configuration mode may include: when the data buffer size of the data corresponding to the service information is less than or equal to the threshold, the processing module 803 enables, based on the correspondence obtained by the obtaining module 802, the transmission module 804 to transmit the data corresponding to the service information on the sidelink transmission resource configured based on the first resource configuration mode or on the sidelink transmission resource configured based on the second resource configuration mode. When the data buffer size of the data corresponding to the service information is less than or equal to the threshold, that the processing module 803 enables, based on the correspondence obtained by the obtaining module 802, the transmission module 804 to transmit the data corresponding to the service information on the sidelink transmission resource configured based on the first resource configuration mode or on the sidelink transmission resource configured based on the second resource configuration mode may include: the obtaining module 802 is further configured to receive second information from the radio access network device, where the second information may include indication information, and the indication information is used to indicate the processing module 803 to enable the transmission module 804 to transmit, when the data buffer size of the data corresponding to the service information is less than or equal to the threshold, the data corresponding to the service information on the sidelink transmission resource configured based on the first resource configuration mode or on the sidelink transmission resource configured based on the second resource configuration mode.

When the resource configuration mode on the sidelink is at least one of the first resource configuration mode and the second resource configuration mode, that the processing module 803 enables, based on the correspondence obtained by the obtaining module 802, the transmission module 804 to transmit the data corresponding to the service information on the sidelink transmission resource configured based on the at least one of the first resource configuration mode and the second resource configuration mode may include: the processing module 803 is further configured to divide the data corresponding to the service information into a first part and a second part based on a percentage, so that the transmission module 804 transmits the first part on the sidelink transmission resource configured based on the first resource configuration mode, and transmits the second part on the sidelink transmission resource configured based on the second resource configuration mode.

Optionally, the obtaining module 802 is further configured to receive information from the first radio access network device, where the information may include the threshold. Alternatively, the first terminal device may further include a storage module 801, configured to store the threshold.

Optionally, the obtaining module 802 is further configured to receive information from the first radio access network device, where the information may include the percentage. Alternatively, the first terminal device may further include a storage module 801, configured to store the percentage.

Optionally, the first resource configuration mode is that the first radio access network device configures a sidelink transmission resource for the terminal device 800, and the second resource configuration mode is that the first terminal device selects a sidelink transmission resource. Alternatively, the first resource configuration mode is that the terminal device 800 selects a sidelink transmission resource, and the second resource configuration mode is that the first radio access network device configures a sidelink transmission resource for the terminal device 800.

Optionally, the first resource configuration mode is that the first radio access network device configures a sidelink transmission resource for the terminal device 800, and the second resource configuration mode is that a second radio access network device configures a sidelink transmission resource for the terminal device 800. Alternatively, the first resource configuration mode is that a second radio access network device configures a sidelink transmission resource for the terminal device 800, and the second resource configuration mode is that the first radio access network device configures a sidelink transmission resource for the terminal device 800. The terminal device 800, the first radio access network device, and the second radio access network device form a dual-connectivity communications architecture.

For example, the service information may include any one of the following: a PPPP, PPPR, a service identifier, or a quality of service flow identifier. The service identifier may include a destination identifier. The quality of service flow identifier may be used to identify a quality of service parameter of the data corresponding to the service information. The quality of service parameter may include any one or more of the following: a resource type, a priority level, a packet delay budget, a packet loss rate, an averaging window, or a maximum data burst volume.

Figure 9:
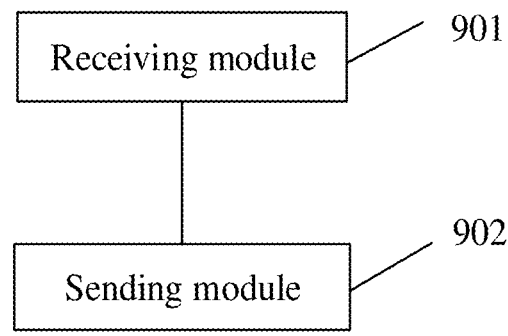
FIG. 9 is a schematic block diagram of a radio access network device according to the embodiments.

Based on a same concept, the embodiments further provide a radio access network device, and the radio access network device may be configured to implement a function performed by the first radio access network device or the second radio access network device in the foregoing method embodiments. A structure and a function of a radio access network device 900 are described below with reference to FIG. 9 in the embodiments. FIG. 9 is a schematic block diagram of the radio access network device 900 according to the embodiments.

For example, the radio access network device 900 may include: a sending module 902, configured to send first information to a terminal device, where the first information may include service information of a service of the terminal device and a resource configuration mode on a sidelink, and there is a correspondence between the service information and the resource configuration mode on the sidelink, where the sidelink is a wireless communications link between the terminal device and another terminal device.

Optionally, the radio access network device 900 may further include a receiving module 901, configured to receive data that is corresponding to the service information and that is from the terminal device.

Optionally, the sending module 902 is further configured to send information to the terminal device, where the information may include a threshold.

Optionally, the sending module 902 is further configured to send second information to the terminal device, where the second information includes indication information, and the indication information is used to indicate the terminal device to transmit, when a data buffer size of the data corresponding to the service information is less than or equal to the threshold, the data corresponding to the service information on a sidelink transmission resource configured based on a first resource configuration mode or on a sidelink transmission resource configured based on a second resource configuration mode.

Optionally, the sending module 902 is further configured to send information to the first terminal device, where the information may include a percentage.

Optionally, the first resource configuration mode is that the radio access network device configures a sidelink transmission resource for the terminal device, and the second resource configuration mode is that the terminal device selects a sidelink transmission resource. Alternatively, the first resource configuration mode is that the terminal device selects a sidelink transmission resource, and the second resource configuration mode is that the radio access network device configures a sidelink transmission resource for the first terminal device.

Optionally, the first resource configuration mode is that the first radio access network device configures a sidelink transmission resource for the terminal device, and the second resource configuration mode is that a second radio access network device configures a sidelink transmission resource for the terminal device. Alternatively, the first resource configuration mode is that a second radio access network device configures a sidelink transmission resource for the terminal device, and the second resource configuration mode is that the first radio access network device configures a sidelink transmission resource for the terminal device. The first terminal device, the first radio access network device, and the second radio access network device form a dual-connectivity communications architecture.

For example, the service information may include any one of the following: a PPPP, PPPR, a service identifier, or a quality of service flow identifier. The service identifier may include a destination identifier. The quality of service flow identifier is used to identify a quality of service parameter of the data corresponding to the service information. The quality of service parameter may include any one or more of the following: a resource type, a priority level, a packet delay budget, a packet loss rate, an averaging window, or a maximum data burst volume.

Figure 10:
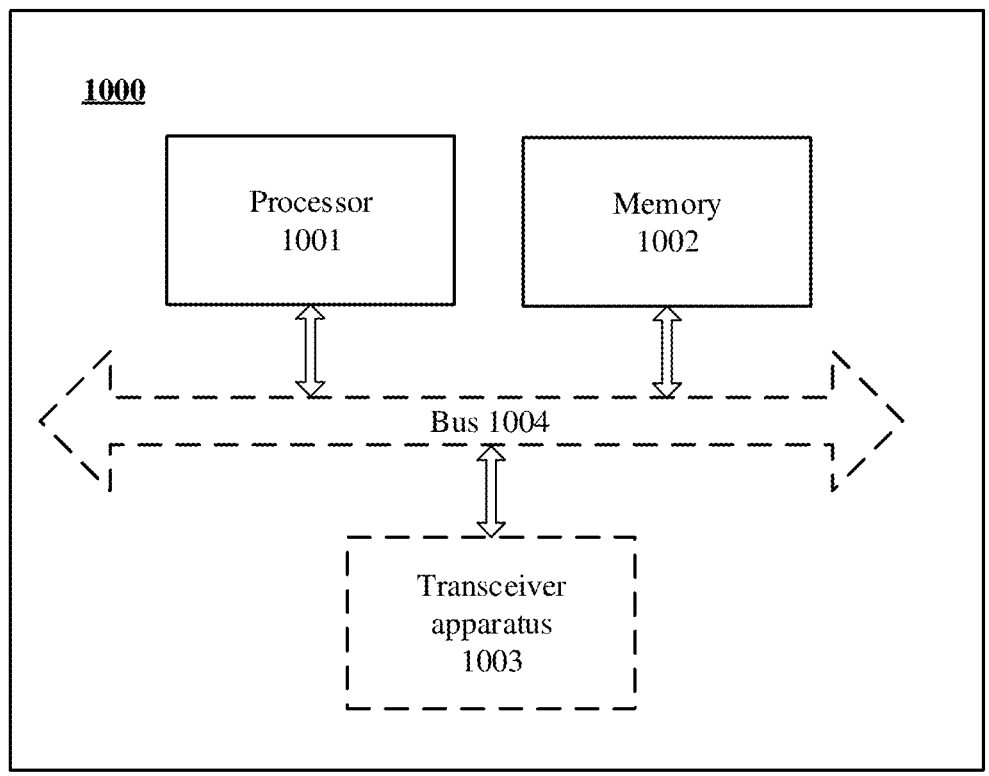
FIG. 10 is a schematic block diagram of a communications apparatus according to this application.

Based on a same concept, the embodiments further provide a communications apparatus. The communications apparatus may be configured to implement a function performed by the first terminal device, the first radio access network device, or the second radio access network device in the foregoing embodiments. A structure and a function of a communications apparatus 1000 are described below with reference to FIG. 10 in the embodiments. FIG. 10 is a schematic block diagram of the communications apparatus 1000 according to the embodiments. The communications apparatus may include at least one processor 1001. When a program instruction is executed in the at least one processor 1001, a function of the first terminal device, the first radio access network device, or the second radio access network device in the communication methods and any implementation thereof provided in the methods 200 to 700 are implemented. Optionally, the communications apparatus 1000 may further include at least one memory 1002, and the memory 1002 may be configured to store a required program instruction and/or required data. Optionally, the communications apparatus 1000 may further include a transceiver apparatus 1003. The transceiver apparatus 1003 may be configured to perform communication interaction between the communications apparatus 1000 and another communications device (for example, a radio access network device or a terminal device, which is not limited herein), for example, exchange control signaling and/or service data. The transceiver apparatus 1002 may be implemented by using a circuit having a communication transceiver function. Optionally, as shown in FIG. 10, the communications apparatus 1000 may further include a bus 1004, and components of the communications apparatus 1000 may be interconnected through the bus 1004.

Figure 11:
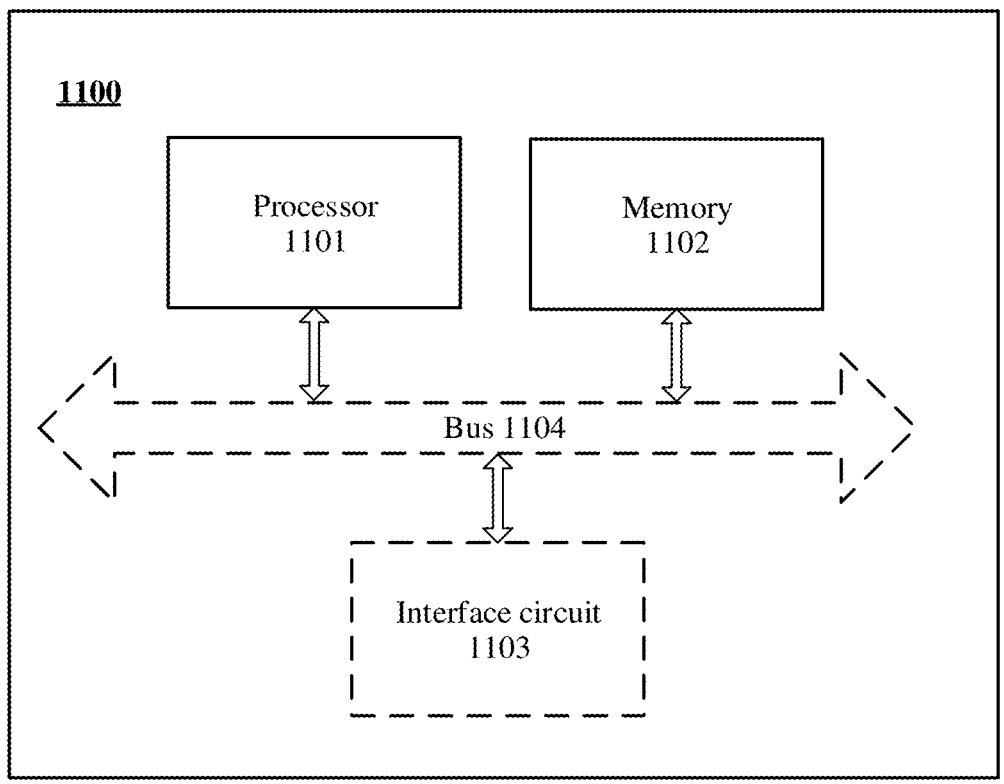
FIG. 11 is a schematic block diagram of a system chip according to the embodiments.

The embodiments provide a system chip 1100. A structure and a function of the system chip 1100 are described below with reference to FIG. 11 in the embodiments. FIG. 11 is a schematic block diagram of the system chip 1100 according to the embodiments. The system chip 1100 may be applied to the first terminal device, or the first radio access network device, or the second radio access network device described above, so that the first terminal device, or the first radio access network device, or the second radio access network device can perform, through processing of the system chip, an operation of the first terminal device, the first radio access network device, or the second radio access network device in the communication methods and any implementation thereof provided in the methods 200 to 700 in the embodiments. As shown in FIG. 11, the system chip 1100 may include at least one processor 1101. When a program instruction is executed in the at least one processor 1101, an operation of the first terminal device, the first radio access network device, or the second radio access network device in the communication methods and any implementation thereof provided in the methods 200 to 700 in the embodiments is implemented. Optionally, the system chip 1100 may further include at least one memory 1102, and the memory 1102 stores a related program instruction. Optionally, the system chip 1100 may further include an interface circuit 1103 and a bus 1104. The at least one processor 1101, the at least one memory 1102, and the interface circuit 1103 are coupled through the bus 1104. The system chip 1100 interacts with another device by using the interface circuit 1103. Optionally, the processor 1101 and the memory 1102 may be combined into one processing apparatus. For example, during specific implementation, the memory 1102 may alternatively be integrated into the processor 1101 or may be independent of the processor 1101.

A person of ordinary in the art may clearly understand that, for the purpose of convenient and brief description, division of the foregoing functional modules is merely used as an example. In an actual application, the foregoing functions may be allocated to different functional modules for implementation based on a requirement or desire. That is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided, it should be understood that the disclosed system, apparatus, and method may be implemented in other manners. For example, the foregoing apparatus embodiments are merely an example. For example, the module or unit division is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in the form of a software function unit and sold or used as an independent product, the integrated unit may be stored in a computer-readable storage medium. Based on such an understanding, the solutions of the embodiments essentially, or the part contributing to the current technology, or all or some of the solutions may be implemented in the form of a software product. The computer software product is stored in a storage medium and may include several instructions for instructing a computer device (which may be, for example, a personal computer, a server, or a radio access network device) or a processor to perform all or some of the steps of the methods described in the embodiments. The foregoing storage medium may include any medium or computer storage medium that can store program code, such as a USB flash drive, a removable hard disk, a read-only memory (ROM), a random access memory (RAM), a magnetic disk, or an optical disc.

The foregoing descriptions are merely implementations of the embodiments, but are not intended to limit the protection scope. Any variation or replacement readily figured out by a person of ordinary skill in the art within the scope disclosed in the embodiments shall fall within the protection scope.

What is claimed is:

1. A communication method, applied to a first terminal device, the method comprising:
receiving, by the first terminal device, first information from a first radio access network device, wherein the first information comprises service information of a service of the first terminal device and a resource configuration mode on a sidelink, and there is a correspondence between the service information and the resource configuration mode on the sidelink; and
transmitting, by the first terminal device based on the correspondence, data corresponding to the service information on a sidelink transmission resource configured based on the resource configuration mode, wherein the sidelink is a wireless communications link between the first terminal device and a second terminal device wherein the transmitting, by the first terminal device based on the correspondence, the data corresponding to the service information on a sidelink transmission resource configured based on the resource configuration mode, comprises any one of:

when the resource configuration mode on the sidelink is a first resource configuration mode, transmitting, by the first terminal device based on the correspondence, the data corresponding to the service information on a sidelink transmission resource configured based on the first resource configuration mode; or when the resource configuration mode on the sidelink is a second resource configuration mode, transmitting, by the first terminal device based on the correspondence, the data corresponding to the service information on a sidelink transmission resource configured based on the second resource configuration mode; or when the resource configuration mode on the sidelink is at least one of a first resource configuration mode and a second resource configuration mode, transmitting, by the first terminal device, the data corresponding to the service information on a sidelink transmission resource configured based on the at least one of the first resource configuration mode and the second resource configuration mode; and wherein when the resource configuration mode on the sidelink is at least one of the first resource configuration mode and the second resource configuration mode, and the transmitting, by the first terminal device, of the data corresponding to the service information on a sidelink transmission resource configured based on the at least one of the first resource configuration mode and on the second resource configuration mode comprises:

dividing the data corresponding to the service information into a first part and a second part based on a percentage; and transmitting, by the first terminal device, the first part on the sidelink transmission resource configured based on the first resource configuration mode, and transmitting, by the first terminal device, the second part on the sidelink transmission resource configured based on the second resource configuration mode.

2. The method according to claim 1, wherein when the resource configuration mode on the sidelink is at least one of the first resource configuration mode and the second resource configuration mode, and the transmitting, by the first terminal device, of the data corresponding to the service information on a sidelink transmission resource configured based on the at least one of the first resource configuration mode and the second resource configuration mode comprises any one of the following:

when a data buffer size of the data corresponding to the service information is greater than or equal to a threshold, transmitting, by the first terminal device, the data corresponding to the service information on the sidelink transmission resource configured based on the first resource configuration mode; or when a data buffer size of the data corresponding to the service information is greater than or equal to a threshold, transmitting, by the first terminal device, the data corresponding to the service information on the sidelink transmission resource configured based on the second resource configuration mode; or when a data buffer size of the data corresponding to the service information is greater than or equal to a threshold, transmitting, by the first terminal device, the data corresponding to the service information on the sidelink transmission resource configured based on the first resource configuration mode and on the sidelink transmission resource configured based on the second resource configuration mode.

3. The method according to claim 1, wherein when the resource configuration mode on the sidelink is at least one of the first resource configuration mode and the second resource configuration mode, and the transmitting, by the first terminal device, of the data corresponding to the service information on a sidelink transmission resource configured based on the at least one of the first resource configuration mode and on the second resource configuration mode comprises:

when the data buffer size of the data corresponding to the service information is less than or equal to the threshold, transmitting, by the first terminal device, the data corresponding to the service information on the sidelink transmission resource configured based on the first resource configuration mode or on the sidelink transmission resource configured based on the second resource configuration mode.

4. The method according to claim 3, wherein when the data buffer size of the data corresponding to the service information is less than or equal to the threshold, and the transmitting, by the first terminal device, of the data corresponding to the service information on the sidelink transmission resource configured based on the first resource configuration mode or on the sidelink transmission resource configured based on the second resource configuration mode comprises:

receiving, by the first terminal device, second information from the first radio access network device, wherein the second information comprises indication information, and the indication information is used to indicate the first terminal device to transmit, when the data buffer size of the data corresponding to the service information is less than or equal to the threshold, the data corresponding to the service information on the sidelink transmission resource configured based on the first resource configuration mode or on the sidelink transmission resource configured based on the second resource configuration mode.

5. The method according to claim 1, wherein the first resource configuration mode comprises that the first radio access network device configures a sidelink transmission resource for the first terminal device, and the second resource configuration mode comprises that the first terminal device selects a sidelink transmission resource; or the first resource configuration mode comprises that the first terminal device selects a sidelink transmission resource, and the second resource configuration mode comprises that the first radio access network device configures a sidelink transmission resource for the first terminal device.

6. The method according to claim 1, wherein the first resource configuration mode comprises that the first radio access network device configures a sidelink transmission resource for the first terminal device, and the second resource configuration mode comprises that a second radio access network device configures a sidelink transmission resource for the first terminal device; or the first resource configuration mode comprises that a second radio access network device configures a sidelink transmission resource for the first terminal device, and the second resource configuration mode comprises that the first radio access network device configures a sidelink transmission resource for the first terminal device, wherein
    the first terminal device, the first radio access network device, and the second radio access network device form a dual-connectivity communications architecture.

7. The method according to claim 1, wherein the service information comprises any one of the following: a ProSe per packet priority, ProSe per packet reliability, a service identifier, or a quality of service flow identifier.

8. A communication apparatus, comprising:
    at least one memory configured to store program instructions; and
    at least one processor configured to execute the program instruction stored in the memory, to enable the apparatus to perform operations comprising:
    receiving first information from a first radio access network device, wherein the first information comprises service information of a service of the apparatus and a resource configuration mode on a sidelink, and there is a correspondence between the service information and the resource configuration mode on the sidelink; and
    transmitting, based on the correspondence, data corresponding to the service information on a sidelink transmission resource configured based on the resource configuration mode, wherein
    the sidelink is a wireless communications link between the apparatus and a terminal device;
    wherein the transmitting based on the correspondence, of the data corresponding to the service information on a sidelink transmission resource configured based on the resource configuration mode, comprises any one of the following:
        when the resource configuration mode on the sidelink is a first resource configuration mode, transmitting, based on the correspondence, the data corresponding to the service information on a sidelink transmission resource configured based on the first resource configuration mode; or
        when the resource configuration mode on the sidelink is a second resource configuration mode, transmitting, based on the correspondence, the data corresponding to the service information on a sidelink transmission resource configured based on the second resource configuration mode; or
        when the resource configuration mode on the sidelink is at least one of a first resource configuration mode and a second resource configuration mode, transmitting the data corresponding to the service information on a sidelink transmission resource configured based on the at least one of the first resource configuration mode and the second resource configuration mode;
    wherein when the resource configuration mode on the sidelink is at least one of the first resource configuration mode and the second resource configuration mode, the transmitting of the data corresponding to the service information on a sidelink transmission resource configured based on the at least one of the first resource configuration mode and on the second resource configuration mode comprises:
        dividing the data corresponding to the service information into a first part and a second part based on a percentage;
        transmitting the first part on the sidelink transmission resource configured based on the first resource configuration mode, and
        transmitting the second part on the sidelink transmission resource configured based on the second resource configuration mode.

9. The communication apparatus according to claim 8, wherein when the resource configuration mode on the sidelink is at least one of the first resource configuration mode and the second resource configuration mode, the transmitting of the data corresponding to the service information on a sidelink transmission resource configured based on the at least one of the first resource configuration mode and the second resource configuration mode comprises any one of the following:
    when a data buffer size of the data corresponding to the service information is greater than or equal to a threshold, transmitting the data corresponding to the service information on the sidelink transmission resource configured based on the first resource configuration mode; or
    when a data buffer size of the data corresponding to the service information is greater than or equal to a threshold, transmitting the data corresponding to the service information on the sidelink transmission resource configured based on the second resource configuration mode; or
    when a data buffer size of the data corresponding to the service information is greater than or equal to a threshold, transmitting the data corresponding to the service information on the sidelink transmission resource configured based on the first resource configuration mode and on the sidelink transmission resource configured based on the second resource configuration mode.

10. The communication apparatus according to claim 8, wherein when the resource configuration mode on the sidelink is at least one of the first resource configuration mode and the second resource configuration mode, the transmitting of the data corresponding to the service information on a sidelink transmission resource configured based on the at least one of the first resource configuration mode and on the second resource configuration mode comprises:
    when the data buffer size of the data corresponding to the service information is less than or equal to the threshold, transmitting the data corresponding to the service information on the sidelink transmission resource configured based on the first resource configuration mode or on the sidelink transmission resource configured based on the second resource configuration mode.

11. The communication apparatus according to claim 10, wherein when the data buffer size of the data corresponding to the service information is less than or equal to the threshold, the transmitting of the data corresponding to the service information on the sidelink transmission resource configured based on the first resource configuration mode or on the sidelink transmission resource configured based on the second resource configuration mode comprises:
    receiving second information from the first radio access network device, wherein the second information comprises indication information, and the indication information is used to indicate the apparatus to transmit, when the data buffer size of the data corresponding to the service information is less than or equal to the threshold, the data corresponding to the service information on the sidelink transmission resource configured based on the first resource configuration mode or on the sidelink transmission resource configured based on the second resource configuration mode.

12. The communication apparatus according to claim 8, wherein the first resource configuration mode comprises that the first radio access network device configures a sidelink transmission resource for the apparatus, and the second resource configuration mode comprises that the apparatus selects a sidelink transmission resource; or the first resource configuration mode comprises that the apparatus selects a sidelink transmission resource, and the second resource configuration mode comprises that the first radio access network device configures a sidelink transmission resource for the apparatus.

13. The communication apparatus according to claim 8, wherein the first resource configuration mode comprises that the first radio access network device configures a sidelink transmission resource for the apparatus, and the second resource configuration mode comprises that a second radio access network device configures a sidelink transmission resource for the apparatus; or the first resource configuration mode comprises that a second radio access network device configures a sidelink transmission resource for the apparatus, and the second resource configuration mode comprises that the first radio access network device configures a sidelink transmission resource for the apparatus, wherein
 the apparatus, the first radio access network device, and the second radio access network device form a dual-connectivity communications architecture.

14. The communication apparatus according to claim 8, wherein the service information comprises any one of the following: a ProSe per packet priority, ProSe per packet reliability, a service identifier, or a quality of service flow identifier.

15. A communication apparatus, comprising:
 at least one memory, configured to store program instructions; and
 at least one processor, configured to execute the program instruction stored in the memory, to enable the apparatus to perform operations comprising:
 sending first information to a first terminal device, wherein the first information comprises service information of a service of the first terminal device and a resource configuration mode on a sidelink, and there is a correspondence between the service information and the resource configuration mode on the sidelink,
 transmitting, based on the correspondence, data corresponding to the service information on a sidelink transmission resource configured based on the resource configuration mode, wherein
 the sidelink is a wireless communications link between the first terminal device and a second terminal device;
 wherein the transmitting based on the correspondence, of the data corresponding to the service information on a sidelink transmission resource configured based on the resource configuration mode comprises any one of the following:
 when the resource configuration mode on the sidelink is a first resource configuration mode, transmitting, based on the correspondence, the data corresponding to the service information on a sidelink transmission resource configured based on the first resource configuration mode; or
 when the resource configuration mode on the sidelink is a second resource configuration mode, transmitting, based on the correspondence, the data corresponding to the service information on a sidelink transmission resource configured based on the second resource configuration mode; or
 when the resource configuration mode on the sidelink is at least one of a first resource configuration mode and a second resource configuration mode, transmitting the data corresponding to the service information on a sidelink transmission resource configured based on the at least one of the first resource configuration mode and the second resource configuration mode;
 wherein when the resource configuration mode on the sidelink is at least one of the first resource configuration mode and the second resource configuration mode, the transmitting of the data corresponding to the service information on a sidelink transmission resource configured based on the at least one of the first resource configuration mode and on the second resource configuration mode comprises:
 dividing the data corresponding to the service information into a first part and a second part based on a percentage;
 transmitting the first part on the sidelink transmission resource configured based on the first resource configuration mode, and
 transmitting the second part on the sidelink transmission resource configured based on the second resource configuration mode.

16. The communication apparatus according to claim 15, wherein the operations further comprise:
 sending second information to the first terminal device, wherein the second information comprises indication information, and the indication information is used to indicate the first terminal device to transmit, when a data buffer size of data corresponding to the service information is less than or equal to a threshold, the data corresponding to the service information on a sidelink transmission resource configured based on a first resource configuration mode or on a sidelink transmission resource configured based on a second resource configuration mode.

* * * * *